(12) United States Patent
Suzuki et al.

(10) Patent No.: US 9,201,888 B2
(45) Date of Patent: Dec. 1, 2015

(54) FILE MANAGEMENT APPARATUS, FILE MANAGEMENT METHOD, AND FILE MANAGEMENT SYSTEM

(71) Applicant: FUJITSU LIMITED, Kawasaki-shi, Kanagawa (JP)

(72) Inventors: Yasuhiro Suzuki, Yokohama (JP); Kohshi Yamamoto, Kawasaki (JP); Masahiro Kataoka, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 93 days.

(21) Appl. No.: 13/770,443

(22) Filed: Feb. 19, 2013

(65) Prior Publication Data

US 2013/0218916 A1    Aug. 22, 2013

(30) Foreign Application Priority Data

Feb. 20, 2012   (JP) .................................. 2012-034568

(51) Int. Cl.
*G06F 17/30* (2006.01)

(52) U.S. Cl.
CPC ...... *G06F 17/30091* (2013.01); *G06F 17/3007* (2013.01)

(58) Field of Classification Search
CPC ................................................ G06F 17/30584
USPC .................................................. 707/968, 972
See application file for complete search history.

(56) References Cited

U.S. PATENT DOCUMENTS

| | | | |
|---|---|---|---|
| 6,223,182 B1* | 4/2001 | Agarwal et al. ......... | 707/999.102 |
| 6,470,287 B1* | 10/2002 | Smartt ......................... | 702/102 |
| 2003/0004938 A1* | 1/2003 | Lawder ............................. | 707/3 |
| 2003/0126247 A1 | 7/2003 | Strasser et al. | |
| 2009/0063396 A1 | 3/2009 | Gangarapu et al. | |
| 2010/0082654 A1* | 4/2010 | Zhang et al. .................. | 707/759 |
| 2011/0153650 A1 | 6/2011 | Lee et al. | |
| 2012/0036163 A1* | 2/2012 | Myers et al. .................. | 707/797 |
| 2012/0203745 A1* | 8/2012 | Myers et al. .................. | 707/691 |

FOREIGN PATENT DOCUMENTS

JP        11-232283        8/1999

OTHER PUBLICATIONS

Jonathan Lawder, "The Application of Space-filing Curves to the Storage and Retrieval of Multi-dimensional Data", Birkbeck College, Dec. 1999.*
Extended European Search Report issued Jun. 24, 2013 in Patent Application No. 13155594.8.
Office Action issued Jul. 14, 2015 in Japanese Patent Application No. 2012-034568 (with English translation).

* cited by examiner

*Primary Examiner* — Khanh Pham
(74) *Attorney, Agent, or Firm* — Oblon, McClelland, Maier & Neustadt, L.L.P.

(57) ABSTRACT

An information processing apparatus includes a processor configured to divide a first file of a first plurality of files stored in a storage device into a second plurality of files, each of the second plurality of files including a different range of values, when each range of values corresponding to each of the first plurality of files includes a specific range and a total size of the first plurality of files exceeds a threshold.

14 Claims, 31 Drawing Sheets

FIG. 12

DATE: FEBRUARY 13, 2011 TO FEBRUARY 13, 2011

```
DATE,TIME,PRODUCT NAME,MONETARY AMOUNT
FEBRUARY 13, 2011,10:22,GUM,100
FEBRUARY 13,11:05,CHOCOLATE,500
FEBRUARY 13,11:23,CHOCOLATE,300
```
~ FX

DATE: FEBRUARY 14, 2011 TO FEBRUARY 14, 2011

```
DATE,TIME,PRODUCT NAME,NUMBER OF ITEMS
FEBRUARY 14, 2011,10:22,WATER,1
FEBRUARY 14,11:05,BATTERY,1
FEBRUARY 14,11:23,RICE BALL,1
```
~ FY

DATE: FEBRUARY 15, 2011 TO FEBRUARY 15, 2011

```
DATE,PRODUCT NAME,NUMBER OF PRODUCTS
FEBRUARY 15, 2011,BATTERY,1
FEBRUARY 15, 2011,CHOCOLATE,1
FEBRUARY 15, 2011,GUM,1
```
~ FZ

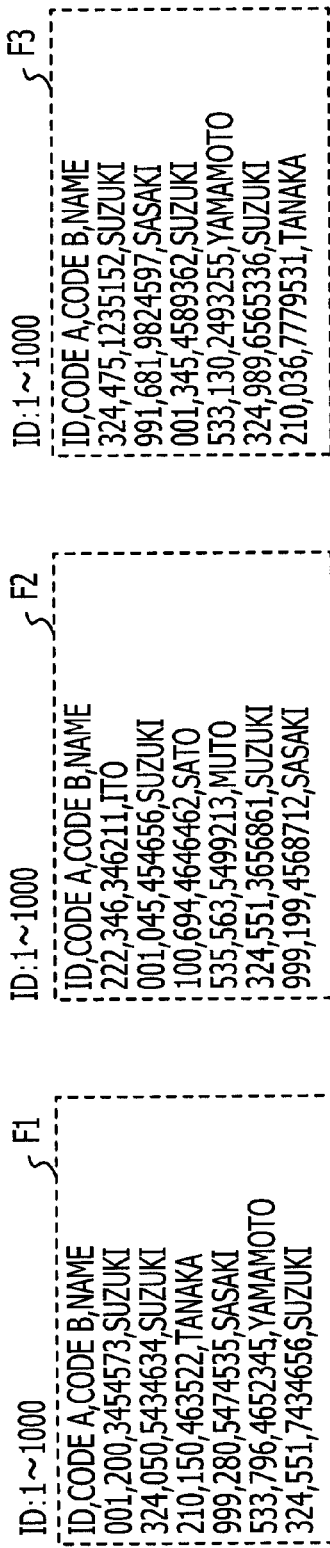

FIG. 14

| FILE NAME | ADDRESS | SIZE | ASSISTANCE INFORMATION 1 | | | ASSISTANCE INFORMATION 2 | | | PARENT FILE NAME |
|---|---|---|---|---|---|---|---|---|---|
| | | | PROPERTY | MINIMUM VALUE | MAXIMUM VALUE | PROPERTY | MINIMUM VALUE | MAXIMUM VALUE | |
| FILE F1 | ad1 | 2M | ID | 001 | 999 | CODE A | 050 | 796 | — |
| FILE F2 | ad2 | 2M | ID | 001 | 999 | CODE A | 045 | 694 | — |
| FILE F3-1 | ad3 | 1M | ID | 001 | 324 | CODE A | 036 | 989 | FILE F3 |
| FILE F3-2 | ad101 | 1M | ID | 533 | 989 | CODE A | 130 | 681 | FILE F4 |
| FILE F4 | ad4 | 2M | ID | 050 | 620 | CODE A | 240 | 566 | — |
| ... | ... | ... | ... | ... | ... | ... | ... | ... | ... |

| ADDRESS | SIZE | FLAG |
|---|---|---|
| ad1 | 2M | 1 |
| ad2 | 2M | 1 |
| ad101 | 1M | 1 |
| ad4 | 2M | 0 |
| ⋮ | ⋮ | ⋮ |

| FILE NAME | FLAG |
|---|---|
| ⋮ | ⋮ |
| FILE F3 | 1 |
| FILE F6 | 0 |
| ⋮ | ⋮ |

```
ID , CODE A , CODE B , NAME
001 , 200 , 3454573 , SUZUKI
324 , 050 , 5434634 , SUZUKI
210 , 150 , 463522 , TANAKA
999 , 280 , 5474535 , SASAKI
533 , 796 , 4652345 , YAMAMOTO
324 , 551 , 7434656 , SUZUKI
222 , 346 , 346211 , ITO
001 , 045 , 454656 , SUZUKI
100 , 694 , 4646462 , SATO
535 , 563 , 5499213 , MUTO
324 , 551 , 3656861 , SUZUKI
999 , 199 , 4568712 , SASAKI
324 , 475 , 1235452 , SUZUKI
991 , 681 , 9824597 , SASAKI
001 , 345 , 4589362 , SUZUKI
533 , 130 , 2493255 , YAMAMOTO
324 , 989 , 6565336 , SUZUKI
210 , 036 , 7779531 , TANAKA
```

FIG. 27

| X | Y | Z | LENGTH (Z) | RANK | LENGTH (X-Y) | RANK |
|---|---|---|---|---|---|---|
| 1 | 45 | 1107 | – | – | – | – |
| 1 | 200 | 20546 | 19439 | 10 | 155 | 11 |
| 210 | 150 | 58140 | 37594 | 7 | 214.89765 | 10 |
| 1 | 345 | 69955 | 11815 | 11 | 285.84261 | 8 |
| 222 | 346 | 111596 | 41641 | 6 | 221.00226 | 9 |
| 324 | 50 | 140580 | 28984 | 8 | 313.08146 | 7 |
| 324 | 475 | 225637 | 85057 | 4 | 425 | 5 |
| 100 | 694 | 290100 | 64463 | 5 | 313.26826 | 6 |
| 533 | 130 | 541222 | 251122 | 1 | 711.04501 | 1 |
| 999 | 280 | 764266 | 223044 | 2 | 489.54673 | 3 |
| 535 | 563 | 788271 | 24005 | 9 | 543.49333 | 2 |
| 991 | 681 | 976619 | 188348 | 3 | 478.76926 | 4 |

FILE MANAGEMENT APPARATUS, FILE MANAGEMENT METHOD, AND FILE MANAGEMENT SYSTEM

CROSS-REFERENCE TO RELATED APPLICATION

This application is based upon and claims the benefit of priority of the prior Japanese Patent Application No. 2012-34568, filed on Feb. 20, 2012, the entire contents of which are incorporated herein by reference.

FIELD

The embodiment discussed herein is related to file management.

BACKGROUND

There is a technique for dividing data items included in a file stored in a database based on whether the data item is included in a range that is among a plurality of set ranges, and generating a plurality of files. When a search process is to be executed on the database using a certain value as a search criterion, the search process is not executed on a file that is among the plurality of files and for which the set range does not include the value used as the search criterion. Thus, the amount of data to be read for the search process is suppressed.

Even if the files are divided and stored in the database, if a range of values for data included in one of the divided files overlaps a range of values for data included in another one of the divided files, both files are read in the search process. Thus, even though data sizes of the divided and stored files are suppressed, a large amount of data is read for the search process, and the search performance is degraded.

SUMMARY

According to one exemplary embodiment, the disclosure is directed to dividing a first file of a first plurality of files stored in a storage device into a second plurality of files, each of the second plurality of files including a different range of values, when each range of values corresponding to each of the first plurality of files includes a specific range and a total size of the first plurality of files exceeds a threshold.

The object and advantages of the disclosure will be realized and attained by means of the elements and combinations particularly pointed out in the claims.

It is to be understood that both the foregoing general description and the following detailed description are exemplary and explanatory and are not restrictive of the disclosure, as claimed.

BRIEF DESCRIPTION OF DRAWINGS

FIG. 12 illustrates an example of files;

FIG. 13 illustrates another example of files;

FIG. 14 illustrates an example of a file management table;

FIG. 15 illustrates an example of a search target table;

FIG. 17 illustrates an example of a division target table;

FIG. 21 illustrates an example of a file;

FIG. 27 illustrates evaluation results of data included in the file;

DESCRIPTION OF EMBODIMENT

When files that are stored in a database are to be searched using "a certain value x belonging to a certain column X" as a search criterion, a file that includes a data group of which a range of values of the column X does not include the value x is not desired to be searched. In other words, even if the file that includes the data group of which the range of the values of the column X does not include the value x is searched using the value x as the search criterion, data that matches the value x is not obtained. Thus, before reading a file into memory, the range of the values of the column X of the data group included in the file is crosschecked with the value x that is used as the search criterion in the search process. As a result, reading of an unwanted file is suppressed.

For example, assume that a file A includes in column X data with value "1", data with value "4" and data with value "7", and a file B includes in column X data with value "5", data with value "9" and data with value "11". Based on this assumption, the values of the column X of the file A are in a range of "1 to 7", while the values of the column X of the file B are in a range of "5 to 11". For example, when a search request that requests data that has a value "3" in the column X is received, because "3" is within the range "1 to 7", file A is searched for data that has the value "3" in the column X. However, because the value "3" is not in the range "5 to 11", a search is not performed on file B. In addition, when a search request for data with a value "6" in the column X is received, both files A and B are searched because the value "6" is in both the range "1 to 7" and the range "5 to 11". In order to execute the search process, files stored in a location, such as an auxiliary storage device, are read into a memory that is a work area of a processor and is, for example, a main storage device. If the search process is not executed on a file, the file may possibly not be read into memory.

FIGS. 1 to 6 illustrate examples of relationships between ranges of values in the column X in files and amounts of data in the files. In each of FIGS. 1 to 6, the vertical axis indicates the amount of data, and the horizontal axis indicates a value in the column X. Each block illustrated in FIGS. 1 to 6 corresponds to a file. The horizontal length of a block indicate a range of values in the column X that is included in the file, while the vertical length of a block indicate the size of the file. In FIGS. 1 to 6, when a range of values in the column X included in a certain file overlaps with another file, information (blocks) for the files is stacked in the vertical direction. Thus, FIGS. 1 to 6 indicate files to be read in order to search for a certain value x and the amounts of data to be read in order to search for the certain value x.

Figure 1:
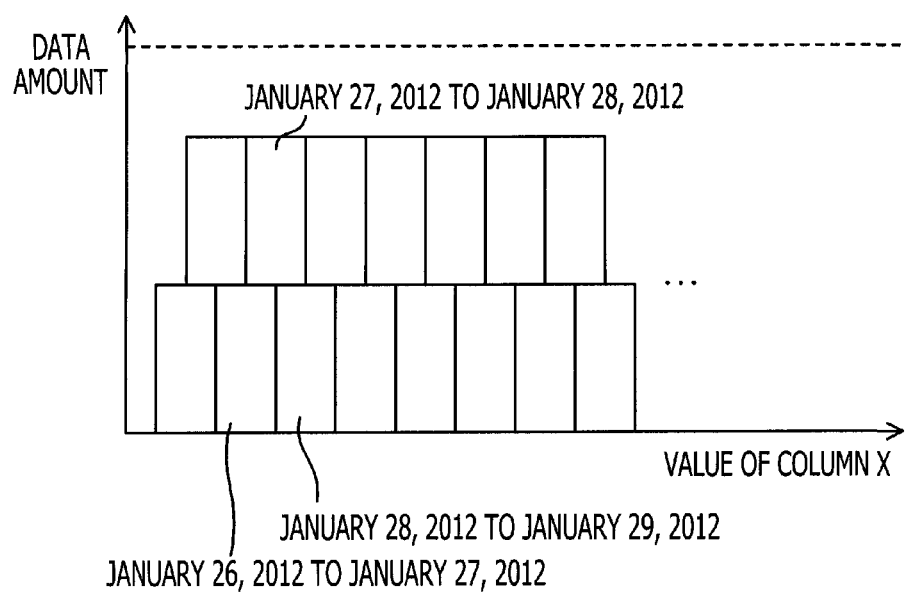
FIG. 1 illustrates an example of relationships between ranges of values for file data and amounts of data.

For example, assume that files that are created by a certain business system are stored in a database. The files created by the business system may be files that are newly created on a daily basis. In this case, when the type of the column X is for example a date, relationships between ranges of values in the column X for each file and the amount of data included in each file may become as illustrated in FIG. 1. In an example illustrated in FIG. 1, with a file that contains date data with the range "January 26, 2012 to January 27, 2012" and a file that contains date data with the range "January 27, 2012 to January 28, 2012", ranges for column X overlap when the value of the date column is January 27, 2012. In addition, with a file with date data with the range "January 27, 2012 to January 28, 2012" and a file with date data with the range "January 28, 2012 to January 29, 2012", ranges for column X overlap when the value of the date column is January 28, 2012.

In the example illustrated in FIG. 1, when searching for data that has "January 27, 2012" as the value of column X, both the file with the date data "January 26, 2012 to January 27, 2012" and the file with the date data of "January 27, 2012 to January 28, 2012" are read. Conversely, the file with the date data of "January 28, 2012 to January 29, 2012" is not desired be read, since the file does not include data for "January 27, 2012" in column X.

A dashed line illustrated in the example of FIG. 1 indicates a threshold for the amount of data to be read into the memory for the search process. The threshold is, for example, the amount of data corresponding to an amount of time (I/O time) to read disk, while the period of time is defined to be in a range that satisfies a requirement for efficiency of the search process. The size of each file does not exceed the threshold, and the threshold is not exceeded even with a range that overlaps other files.

In the example of FIG. 1, while parts of a range of values in the column X overlaps for some files, there are files of which the range of values in the column X do not overlap. If a column X that is included in search criteria is a date column, with a business system that regularly creates new files, incidents of overlap for the ranges may be small.

Figure 2:
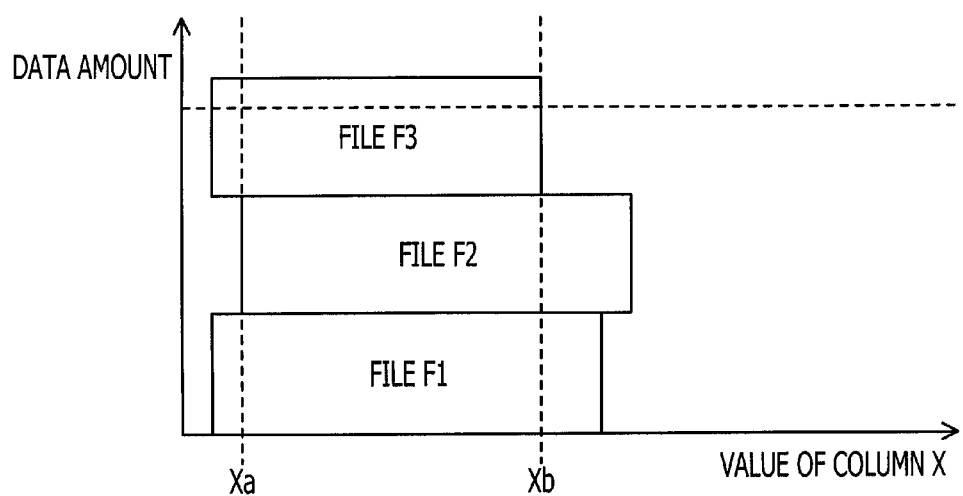
FIG. 2 illustrates an example of relationships between ranges of values for file data and amounts of data.

As illustrated in FIG. 2, however, ranges of values in the column X for files may almost completely overlap. For example, if the column X that is to be searched are things such as employee IDs or product prices, when a value that is common to each file may be used, ranges for the value may easily overlap among the files.

FIG. 2 illustrates relationships between ranges of values for the column X in files F1, F2 and F3 and the size of the files F1, F2 and F3. Values of the column X for the files F1 to F3 overlap in a range from Xa to Xb. The total size of the files F1 to F3 exceeds the threshold that is set in the same manner as the example of FIG. 1.

Figure 3:
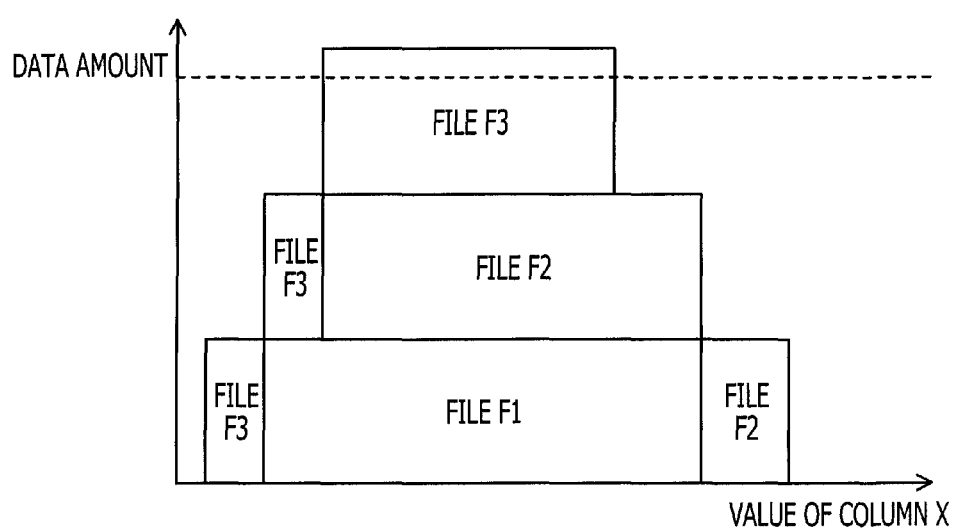
FIG. 3 illustrates an example of relationships between ranges of values for file data and amounts of the data.

FIG. 3 more precisely illustrates the example of FIG. 2. In FIG. 2, for ease of understanding, one block corresponds to one file. FIG. 2 does not precisely illustrate the total amount of data to be read when values of column X are smaller than the value Xa. As illustrated in the example of FIG. 3, if values of the column X are smaller than the value Xa or larger than the value Xb, the total size of the files F1, F2 and F3 does not exceed the threshold. For ease of understanding, in FIGS. 4 and 5, one block corresponds to one file, in the same manner as FIGS. 1 and 2.

Figure 4:
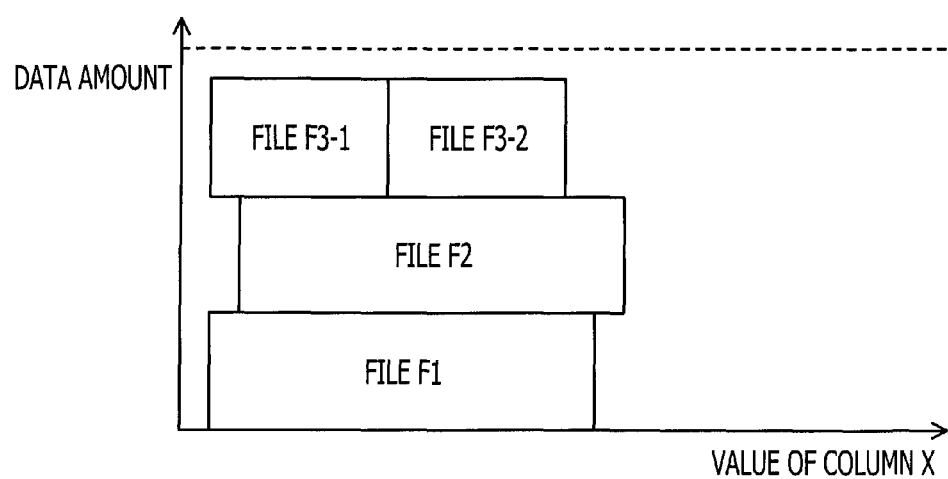
FIG. 4 illustrates an example of relationships between ranges of values for file data and amounts of data.

FIG. 4 illustrates relationships between ranges of values of column X and the amounts of the data when the file F3 is divided into files F3-1 and F3-2. When the total size of the files F1, F2 and F3 exceeds the threshold as illustrated in FIG. 2, the file F3 is divided into a plurality of files of which ranges of values of the column X do not overlap each other, thereby making it easier to select a group of files whose total size does not exceed the threshold. In other words, the amount of data to be read into memory in order to execute the search process may be suppressed to an amount that is equal to or lower than the threshold. Dividing certain file into a plurality of files may mean, for example, sorting data included in the certain file based on values of column X, and then creating one file that includes first half data, and another file that includes second half data. For example, assume that values of data of the column X in the file F3 are "4, 7, 11, 5, 1 and 9". When the data included in the file F3 is sorted based on the values of the column X, the data included in the file F3 is arranged in the order "1, 4, 5, 7, 9 and 11". The file F3 is, for example, divided into a file F3-1 with data that has the values "1, 4 and 5" for the column X and a file F3-2 with data that has the values "7, 9 and 11" for the column X. The values of the column X for the file F3-1 are in a range of "1 to 5", while the values of the column X for the file F3-2 are in a range of "7 to 11". While the file F3 includes six data items, the files F3-1 and F3-2 each include three data items. Thus, the amount of the data that corresponds to the values of the column X may be reduced. As illustrated in FIG. 4, the total amount of the data of the files F1, F2 and F3 (F3-1 and F3-2) may be reduced to an amount that is less than or equal to the threshold.

Figure 5:
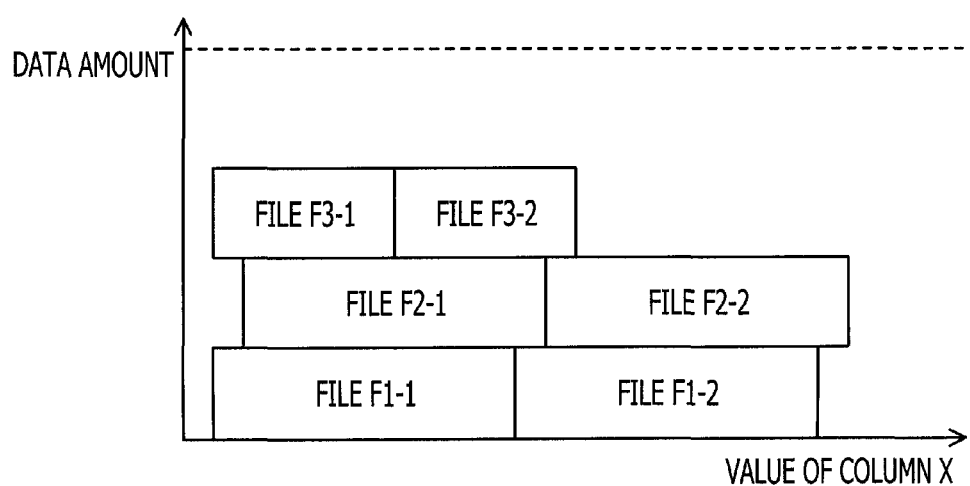
FIG. 5 illustrates an example of relationships between ranges of values for file data and amounts of data.

If the total size of the files F1, F2 and F3 exceeds the threshold, the files F1, F2 and F3 may be divided as illustrated in the example of FIG. 5. In this case, the amount of data to be read into the memory for the search process may be further suppressed.

Figure 6:
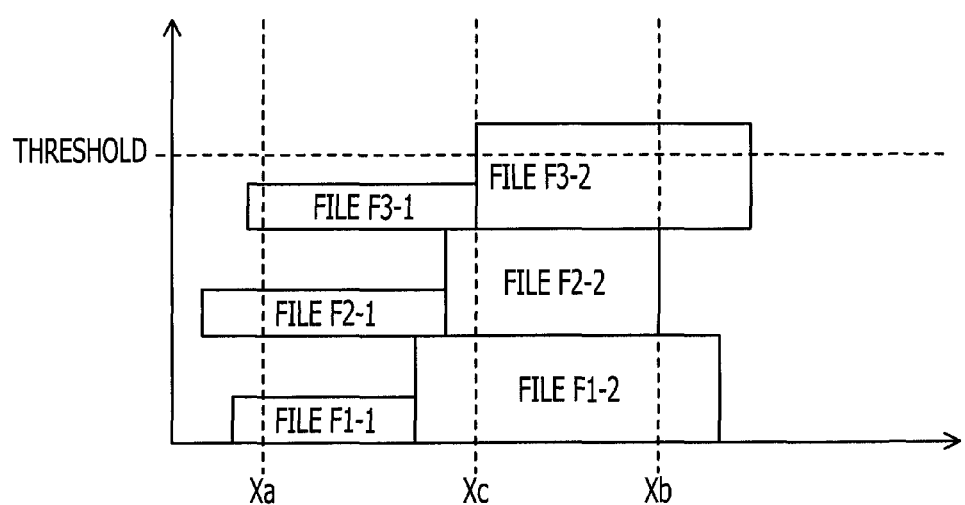
FIG. 6 illustrates an example of relationships between ranges of values of file data and amounts of data.

However, even if the files F1, F2 and F3 are divided, depending on how the division was performed, the total size of divided files may exceed the threshold as illustrated in an example of FIG. 6. In this case, for example, files (files F1-2, F2-2 and F3-2), of which data of values in the column X is in a range from a value Xc to the value Xb and which have a larger amount than the threshold, are divided again. The amount of data to be read for each value of the column X of divided files is less than or equal to the amount of data to be read for the value of the column X of the original files. Thus, by repeating the division, the amount of data to be read for each of values of the column X may be reduced to an amount that is smaller than the threshold.

A plurality of files, which are obtained by dividing each of the files F1, F2 and F3 when the amount of data to be read from the files F1, F2 and F3 exceeds the threshold, may possibly not be files of which ranges of values of the column X do not overlap each other, and may simply be files of which ranges of values of the columns are different from each other. For example, it is assumed that values of data of the column X of the file F3 are "4, 7, 11, 5, 1 and 9". The file F3 may be divided into a file F3-3 with data that has the values "1, 4 and 7" for the column X and a file F3-4 with data that has the values "5, 9 and 11" for the column X. The values of the column X of the files F3-3 and F3-4 overlap with a range of values "5 to 7". Thus, the files F3-3 and F3-4 are read for a search process whose search criterion uses a value that is in the range of the values "5 to 7". For example, reading of the file F3-4 is suppressed for a search process whose search criterion uses a value that is in a range of "1 to 4".

Figure 7:
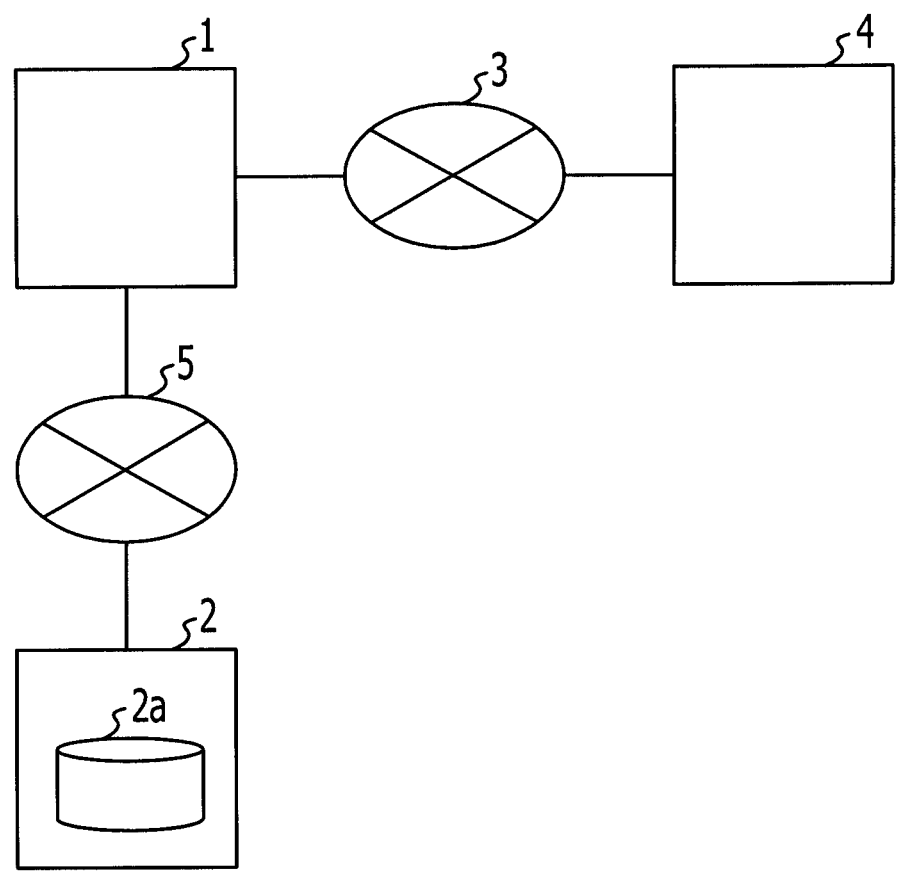
FIG. 7 illustrates an example of a hardware configuration of a file management system.

FIG. 7 illustrates an example of the configuration of a file management system according to an embodiment. The file management system according to the embodiment includes a computer 1, a storage device 2, a network 3, a computer 4 and a network 5. The computer 1 performs storage processing, management and search processing for files stored in the storage device 2. The storage device 2 includes a storage medium 2a and stores a file in the storage medium 2a in response to control executed by the computer 1. The computer 4 communicates with the computer 1 through the network 3. The computer 4 transmits a search request to the computer 1 and receives a search result from the computer 1, for example. The computer 4 uploads a file to the computer 1, for example. The network 3 is a network, such as the Internet or an intranet. The computer 1 and the storage device 2 communicate with each other through the network 5. The network 5 may be the Internet or an intranet, or may be a network that uses a fiber channel, such as a storage area network (SAN). For example, when the computer 1 receives a search request from the computer 4, the computer 1 searches a file stored in the storage device 2 and transmits a search result to the computer 4. Furthermore, for example, when the computer 1 receives, from the computer 4, a request to upload a file, the computer 1 causes the file to be stored in the storage device 2 and manages the file.

Figure 8:
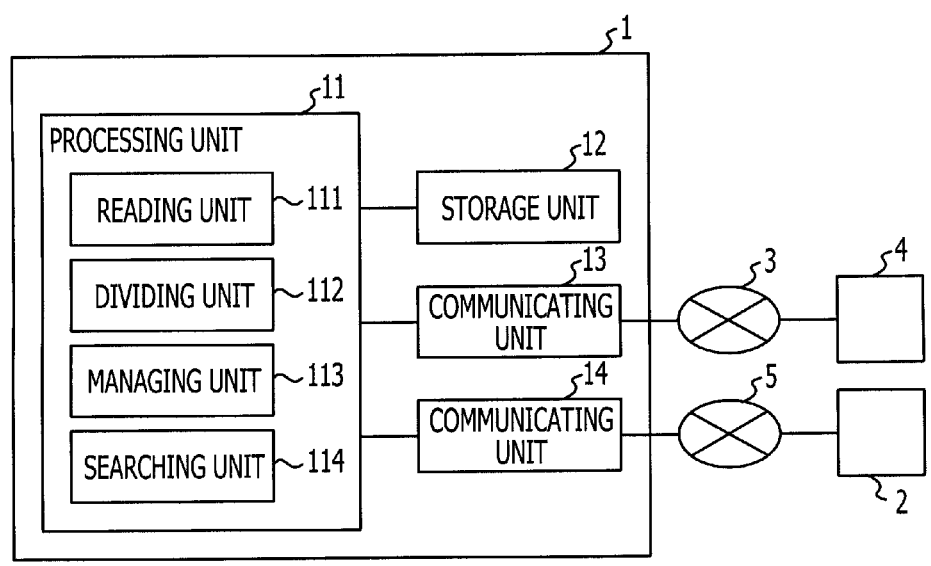
FIG. 8 illustrates an example of a functional configuration of a computer.

FIG. 8 illustrates an example of a functional configuration of the computer 1. The computer 1 includes a processing unit 11, a storage unit 12 and communicating units 13 and 14. The processing unit 11 includes a reading unit 111, a dividing unit 112, a managing unit controller 113 and a searching unit 114. The processing unit 11 executes calculations that are related to a search process to be executed on the storage device 2, file management processing and file storage processing. The processing unit 11 also controls the storage unit 12 and the communicating units 13 and 14. The storage unit 12 stores data and serves as a work area for the processing unit 11. The communicating unit 13 communicates with the computer 4 through the network 3. The communicating unit 14 communicates with the storage device 2 through the network 5.

When the computer 4 transmits a request to upload a file to the communicating unit 13 and the reading unit 111 receives the upload request from the communicating unit 13, the reading unit 111 causes the requested file to be stored in the storage device 2. First, reading unit in addition to information, such as the size of data of the file that is to be uploaded and the name of the file, the reading unit 111 causes information, such as a property of a candidate for a search target and a range of values for the property, to be stored in the storage device 2. For example, the property may be meta data including at least one of a file size, date of creation, date of update, data type (such as text data, image data, or movie data). In addition, the reading unit 111 references information, such as the size of data for other files stored in the storage device 2, the property of the candidate for the search target and the range of the values of the property, and determines, based on results of the reference, a file to be divided.

When the file to be divided is determined, the dividing unit 112 divides the file. After dividing the file, the dividing unit 112 references information such as the size of data for other files stored in the storage device 2, a property of a candidate for a search target and a range of values for the property and determines, based on a result of the reference, a file to be divided.

The managing unit controller 113 manages files stored in the storage device 2. The managing unit controller 113 references information such as the size of data for a group of files stored in the storage device 2, a property of a candidate for a search target, and a range of values for the property and determines, based on results of the reference, a file to be divided.

When the communicating unit 13 receives a search request from the computer 4, the searching unit 114 references information such as the size of data for a group of files stored in the storage device 2 by the storage unit 12, a property of a candidate for a search target, and a range of values of the property and determines a file to be searched. The searching unit 114 reads the file to be searched into the storage unit 12, extracts data satisfying a search criterion included in the search request, and causes the communicating unit 13 to transmit the extracted data to the computer 4.

Figure 9:
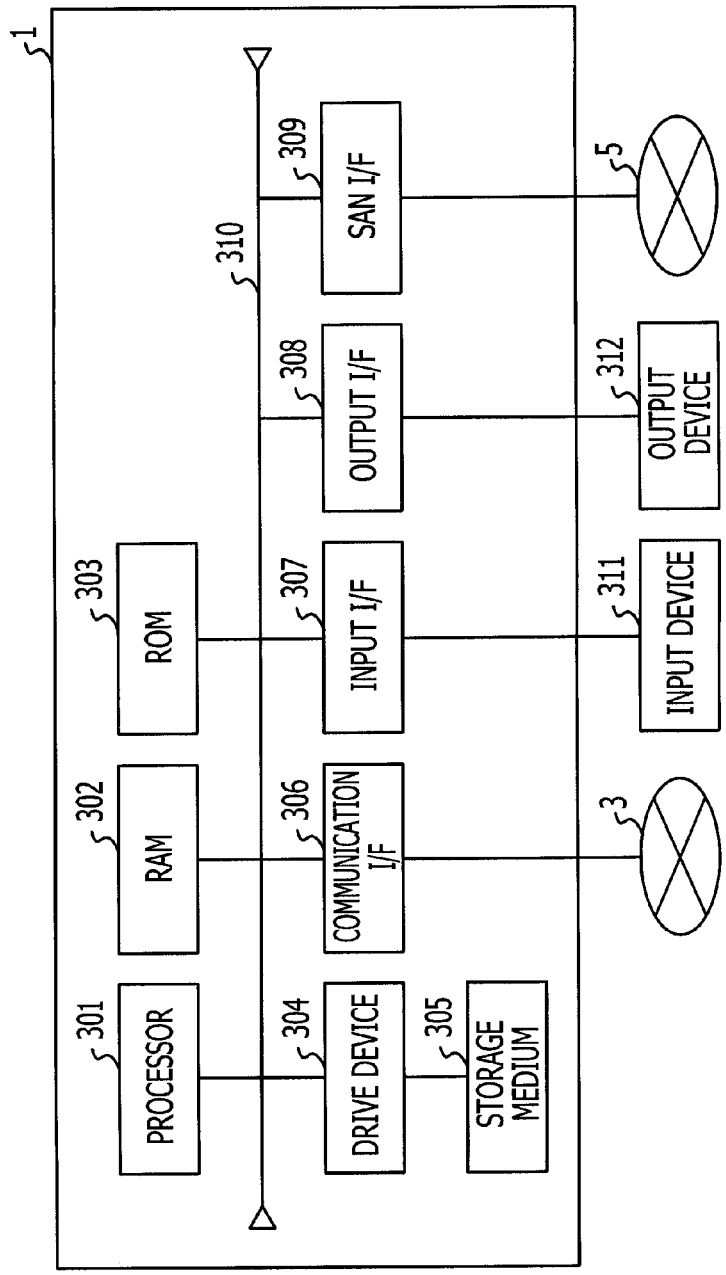
FIG. 9 illustrates an example of a hardware configuration of the computer.

FIG. 9 illustrates an example of a hardware configuration of the computer 1. For example, the computer 1 includes a processor 301, a random access memory (RAM) 302, a read-only memory (ROM) 303, a drive device 304, a storage medium 305, a communication interface (I/F) 306, an input interface (I/F) 307, an output interface (I/F) 308 and an SAN interface (I/F) 309. The hardware parts are connected to each other through a bus 301. The communication I/F 306 controls communication through the network 3. The SAN I/F 309 controls communication through the network 5. The input interface 307 is connected to an input device 311 and transmits a signal received from the input device 311 to the processor 301. The output interface 308 is connected to an output device 312 and causes the output device 312 to output in response to an instruction of the processor 301.

The RAM 302 is a readable and writable memory device. For example, semiconductor memory such as static RAM (SRAM) or dynamic RAM (DRAM) is used as the RAM 302. In addition, flash memory may be used instead of the RAM 302. The ROM 303 may consist of programmable ROM (PROM). The drive device 304 is a device that performs at least one of reading information from or writing information to the storage medium 305. The storage medium 305 stores information written by the drive device 304. The storage medium 305 is a hard disk, a compact disc (CD), a digital versatile disc (DVD), a Blu-ray disc or the like. For example, the computer 1 has a drive device 304 and storage medium 305 for each of multiple types of storage media.

The input device 311 is a device that transmits an input signal in response to manipulation. For example, the input signal is generated by a key device such as a keyboard or a button attached to the body of the computer 1 or a pointing device such as a mouse or a touch panel. The output device 312 is a device that outputs information in response to control executed by the computer 1. The output device 312 is an image output device (that is, a display device) such as a display or an audio output device such as a speaker, for example. In addition, for example, an input and output device such as a touch screen may be used as the input device 311 and the output device 312.

The processor 301 reads a program stored in the ROM 303 or the storage medium 305 into the RAM 302 and executes a process for the processing unit 11 in accordance with procedures of the read program. In this case, the RAM 302 is used as a work area of the processor 301 and achieves a function of the storage unit 12. The program that is read by the processor 301 is to be described with reference to FIG. 10.

Figure 10:
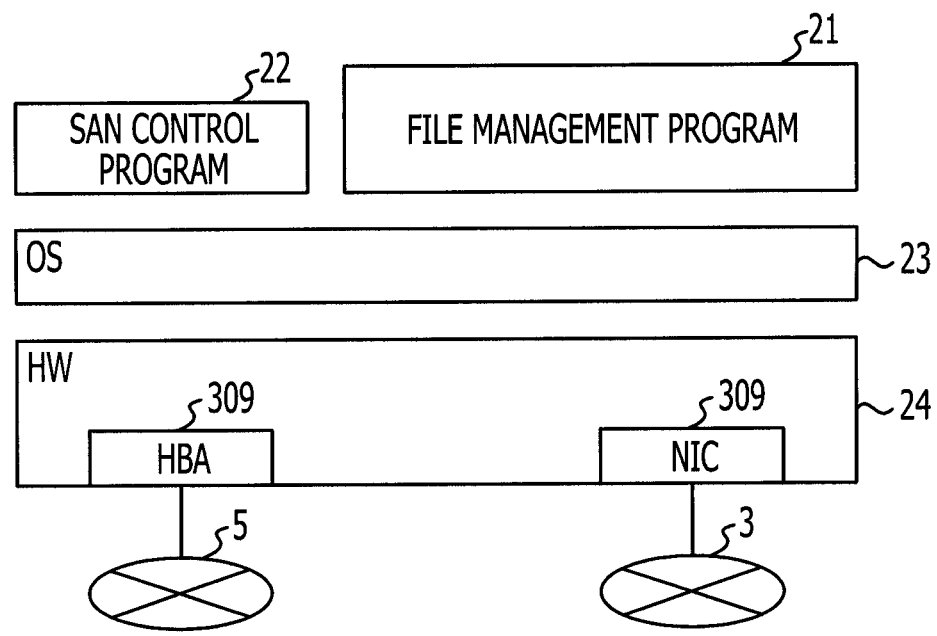
FIG. 10 illustrates an example of a software configuration of the computer.

FIG. 10 illustrates an example of the configuration of software that is executed by the computer 1. An operating system (OS) 23 is executed on the computer 1 and controls a hardware group 24 that is the group of hardware illustrated in FIG. 9. The processor 301 operates in accordance with procedures of the OS 23 and controls and manages the hardware group 24, and thereby processes are executed by the hardware group 24 using an application program and middleware. Furthermore, for example, as part of the computer 1, middleware such as a file management program 21 and an SAN control program 22 is read into the RAM 302 and executed by the processor 301. The processor 301 executes a process based on the SAN control program 22, and thereby controls the SAN I/F 309, which may be a host bus adaptor (HBA), in a similar manner to how processing for the communicating unit 14 is executed. The processor 301 executes processes in accordance with the file management program 21 (so that the processes control the hardware group 24 in accordance with the OS 23) and thereby achieves functions of the processing unit 11, the storage unit 12, the communicating unit 13 and the communicating unit 14.

Figure 11:
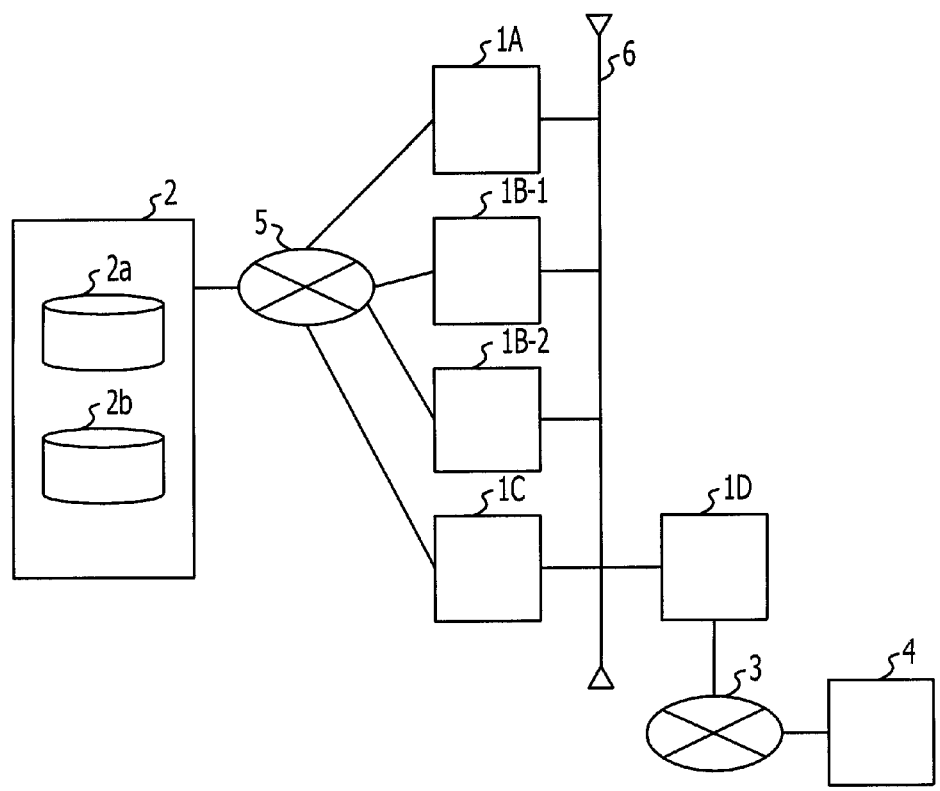
FIG. 11 illustrates another example of the hardware configuration of the file management system.

FIG. 11 illustrates another example of the configuration of the file management system. The file management system illustrated in FIG. 8 may be configured as illustrated in FIG. 11. In the file management system illustrated in FIG. 11, the functions of the computer 1, as illustrated in FIG. 8, are achieved by a plurality of computers. For example, the file management system includes a managing device 1A, a searching device 1B-1, a searching device 1B-2, a reading device 1C, a web server 1D and a LAN 6 instead of the computer 1 illustrated in FIG. 8. For example, the managing device 1A manages accumulated data and executes the processes of the dividing unit 112 and managing unit controller 113 that are illustrated in FIG. 8. For example, the searching devices 1B (searching devices 1B-1 and 1B-2) execute the process of the searching unit 114 (illustrated in FIG. 8), such as a process of searching the accumulated data. The reading device 1C executes the process of reading unit 111 (illustrated in FIG. 8), such as a process of reading data from the business system. The web server 1D relays data among the computer 4 of the business system, the managing device 1A, the searching device 1B and the reading device 1C. Since the devices in the system illustrated in FIG. 11 are separated by function, it may be easy to handle the case where the frequency of use of a specific function increases. For example, if new data is not frequently stored and the number of search requests increases, a response such as adding a searching device may be taken. As illustrated in FIG. 11, the storage device 2 may have a storage medium 2b in addition to the storage medium 2a. If the amount of data to be stored is increased in accordance with control executed by the reading unit 111, a storage medium may be added to the storage device 2, for example. In addition, for example, a storage device other than the storage device 2 may be added.

File management that is executed by the file management system illustrated in FIGS. 8 and 11 will be described in detail. Files that are managed by the file management system are, for example, files FX, FY and FZ illustrated in FIG. 12 and files F1, F2 and F3 illustrated in FIG. 13, and are comma-separated value (CSV) data. Alternatively, files that are managed by the file management system may be XML files. A fixed-length data format may be used for the files.

With a file in the CSV format, a plurality of data items that are included in each of records separated by newlines are delimited by commas. Regarding formats that are similar to the CSV format, in one format a plurality of data items are delimited using a tab, and in another format, a plurality of data items are delimited by one-byte spaces. However, these formats may be treated in the same manner as the CSV format. With the CSV format, by determining which position a data item is within a record that is delimited by commas, the property (that is, category) of the data item is determined. In other words, properties of data items that are included in different records and exist at the same position among positions delimited by commas are the same. The property indicates, for example, the role of the data in the business system that creates files. For example, properties are defined in the order of "date, time, product name, price" in the files FX, FY and FZ. The first data item included in each record is treated as data indicating a "date" in the business system. The next data item included in each record is treated as data indicating a "time". In the files F1, F2 and F3, properties are defined in the order of "ID, code A, code B, name". If a fixed-length format is used, properties are also defined based on the positions of data. In XML files, properties are defined by tags added to data included in the files.

FIG. 14 illustrates an example of management information used in the file management system. With a file management table T1 illustrated in FIG. 14 the name for each file is stored along with an associated address for the stored file, the size of the file, search assistance information, and the name of a parent file. The search assistance information includes a property that may be a candidate for a search target as well as the minimum and maximum values for data that is included in the files and belongs to the property. A property that may be a candidate for a search target may, for example, be set from the business system and may be a property that, based on past statistics, has been searched on numerous times. Alternatively, search assistance information for all properties included in the files may be stored in the file management table T1. The name of the parent file is the name of a file that was divided to produce the corresponding file. In order to read a file that has a specified name, the managing unit controller 113 extracts the file with the name that matches the specified file name and is among file names included in the file name column of the file management table T1. If the specified file name is not found in the file name column, the managing unit controller 113 extracts the file with the name that matches the specified file name and is among file names in the parent file name column of the file management table T1. If the names of multiple divided files match the specified file name, the managing unit controller 113 outputs the matching files together. The file management table T1 is stored in the RAM 302, for example. When the file management program 21 is terminated, the file management table T1 is stored in the storage medium 305.

The search process that is executed on the files managed using the file management table T1 will be described with reference to FIG. 14. For example, when a request to search data for which an property "ID" is "600" is received, the searching unit 114 references the file management table T1 and extracts files of which ranges of data of the property "ID" include "600" (that is, files in which the minimum value of "ID" is less than or equal to "600" and the maximum value is greater than or equal to "600"). Then, the searching unit 114 stores data for the extracted files in a search target table T2 as illustrated in FIG. 15. In the search target table T2, for example the address and size of an extracted files is stored. In addition, flag information that indicates whether the search process has been terminated is stored in the search target table T2. The searching unit 114 references the search target table T2, reads into memory, from an address stored in the search target table T2, data that is included in a file yet to be searched and has a size stored in the search target table T2, searching unit and executes the search process on the data. Information on the files F1, F2, F3-2 and F4 in which the property "ID" is "600" is stored in the search target table T2. Since values of data for the property "ID" of the file F3-1 are in a range of "001 to 324", the file F3-1 is not stored in the search target table T2. The flag information for a file subjected to the search process is changed (from "0" to "1" in the example illustrated in FIG. 15).

In another method, search assistance information that does not specify an property is used. For example, for each of files stored in the storage device 2, a range (the minimum value and the maximum value) for values of data included in the file may be associated, and whether the value "600" is included in the file may be determined by comparing the range with the value "600", which is the search criterion.

In addition, as another method, there is a method for managing files with a fixed size of a data unit (page) to be stored in the storage device 2. For each page, the range of values for data included in the page is associated, and whether the page is to be read for the search process is determined by comparing the range with the search criterion. In this case, since the sizes of a page is fixed, the files are managed using addresses (or page numbers) in the file management table T1 and the search target table T2, instead of using addresses and sizes.

The aforementioned processes (file storage process, file management process and search process) for the file management system are described below in detail.

Figure 16:
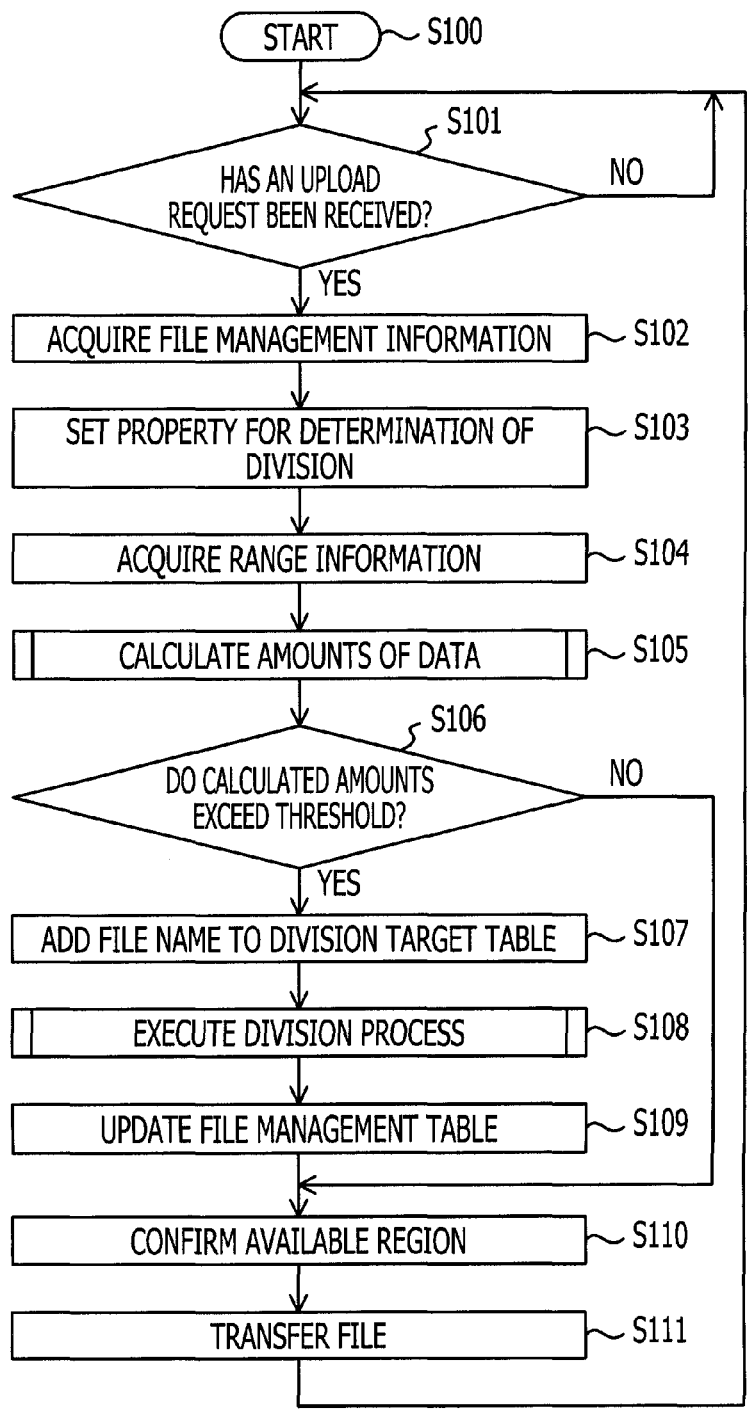
FIG. 16 is an example of a flowchart for a file storage process.

FIG. 16 is an example of a flowchart for the process flow when newly storing a file in the storage device 2. When the reading unit 111 is capable of processing (in S100), the reading unit 111 determines whether the reading unit 111 has received an upload request transmitted by the computer 4 from the communicating unit 13 (in S101). If the reading unit 111 has not received the upload request (No in S101), the reading unit 111 makes the determination of S101 again. If the reading unit 111 has received the upload request (Yes in S101), the reading unit 111 acquires the name of the file requested to be uploaded, the size of the file, the search assistance information, and file management information, such as information defined in the file, and causes the acquired information to be stored in the file management table T, which is stored in the storage unit 12 (in S102). The size of the file may be calculated directly from the file, which is acquired from the computer 4 through the communicating unit 13, or may be acquired from metadata that has been added to the file. Regarding search assistance information, property and range information (maximum value and minimum value) may be acquired from metadata that has been added to the file. Alternatively, the reading unit 111 may search columns included in the file and thereby acquire property and the range information.

After the processing of S102, the reading unit 111 sets the property, which is included in the file, used for a determination of division (in S103). For example, the property is set based on a preset policy. For example, depending on, for example, reading unit a file format, the ID of an application executed on the computer 4, the ID of a client that requests the uploading of the file, or a pattern of the file name, the reading unit 111 determines which property that is included in the file to use for the determination of the division. For example, assume that it is apparent from past statistics that the frequency of searching, based on "date", files created by the business system, which uses the computer 4, tends to be high. Based on this assumption, it may be probabilistically estimated that performance is improved by file division that reduces the amount of data to be read for a search executed based on "date". Thus, which property is to be used for determining the division is determined based on information such as the ID identifying the application used for the business system and the ID of the client that uses the business system. The property that is used for determining the division may be determined for each file to be uploaded or may be determined collectively for a group of files stored in the storage device 2 based on an overall tendency of the group of the files stored in the storage device 2.

Then, the reading unit 111 acquires, from the file management table T1 stored in the storage unit 12, information on the range of values for the property, which is used for determining the division, determined in S103 for each file stored in the storage device 2 (in S104). Furthermore, the reading unit 111 calculates, based on the range information acquired in S104, the amount of data to be read when each value of the property, which is used for determining the division, is a search criterion (in S105). The method for S105 is described later.

Figure 17:
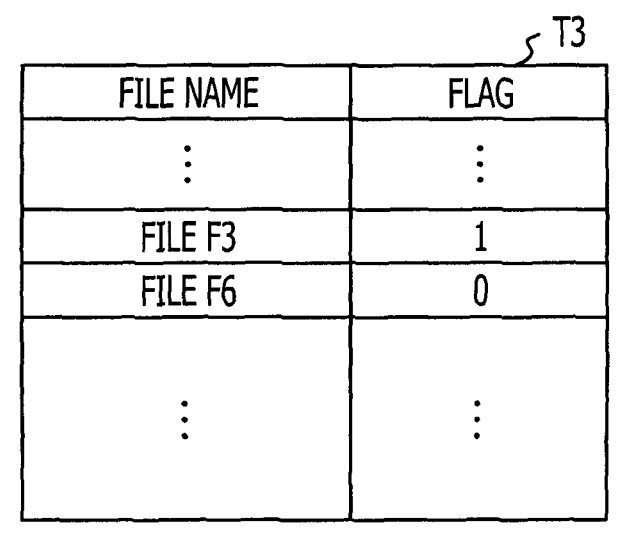

The reading unit 111 determines whether the amounts calculated in S105 exceed a preset threshold (in S106). If an amount exceeds the threshold (Yes in S106), the reading unit 111 causes the name of the file that is to be uploaded to be stored in a division target table T3 as illustrated in FIG. 17 (in S107). Alternatively, in the process of S107, the reading unit 111 may cause the name of a certain file to be stored in the division target table T3. The certain file either includes data of which a range of values is determined in S106 to exceed the threshold, or includes data of which the range of the values partially overlaps the threshold. The division target table T3 is stored in the storage unit 12. The dividing unit 112 divides the file that has the name stored in the division target table T3 (in S108). The division process is described later in detail. When the file is divided in S108, the dividing unit 112 updates a flag of the division target table T3 and causes file management information of the file that was divided to be stored in the file management table T1, which is stored in the storage unit 12 (in S109).

For example, after the process of S109, the processes of S102 to S109 may be executed again. In doing so, the reading unit 111 determines whether the total size of a file group after the division of S108 exceeds the threshold (the process of S106 is executed again). If the total size exceeds the threshold (Yes in S106), the reading unit 111 (or the managing unit controller 113) causes the name of a file that is included in the file group after the division of S108 to be stored in the division target table T3 (in S107), and the dividing unit 112 divides the file again. In this manner, the amount of data to be read for the search process may be suppressed by repeating the processes of S102 to S109.

If the amounts, calculated in S105, of data to be read do not exceed the threshold (No in S106), or when the process of S109 completes, the reading unit 111 checks the available space in the storage device 2 (in S110). If available space does not exist, the reading unit 111 outputs an error. Next, the reading unit 111 causes the communicating unit 115 to transfer the file requested to be uploaded to the address of the available space, which has been checked (in S111). The process of storing the file, which was requested to be uploaded in S111, finishes and then, the file storage process returns to the process S101 to determine whether there is a further file to be uploaded.

Figure 18:
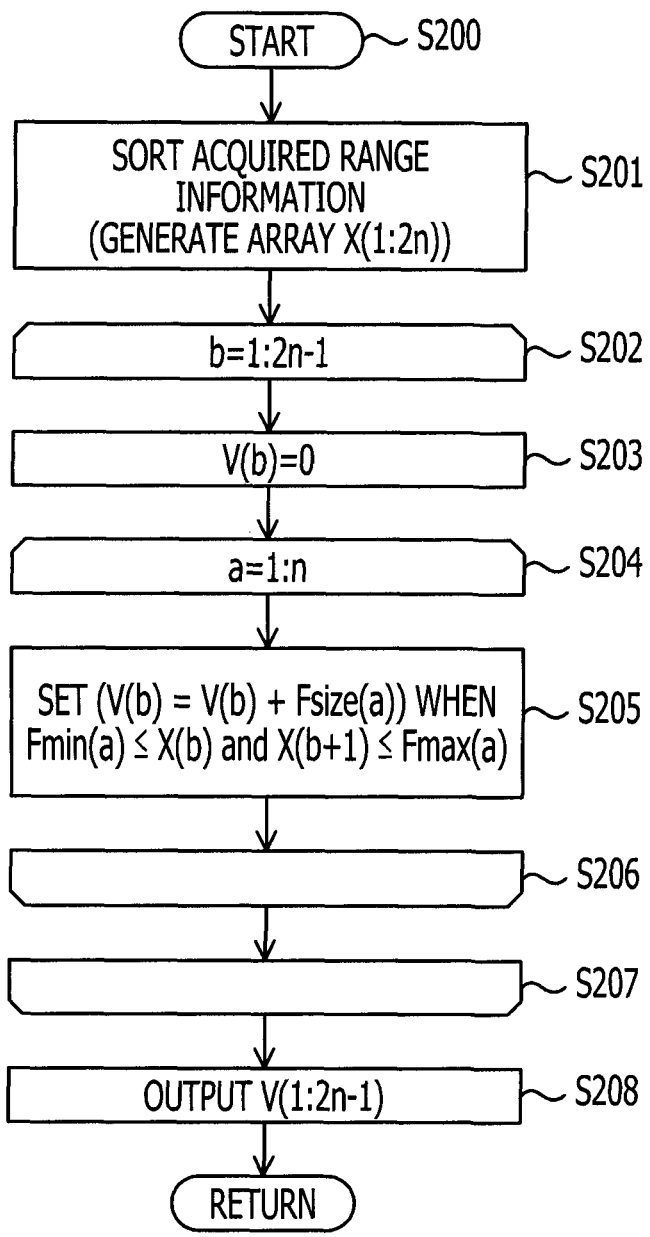
FIG. 18 is an example of a flowchart for a process of calculating the amounts of data to be read.

FIG. 18 is an example of a flowchart of a process of calculating the amount of data to be read for each value of the property that is used in the division determination. Although the reading unit 111 executes the process illustrated in FIG. 18 as described below, the managing unit controller 113 may execute the process illustrated in FIG. 18. Firstly, the reading unit 111 starts the process (in S200). The reading unit 111 sorts the maximum and minimum values, which were acquired in S104 for each file (in S201). When the number of the files is n, an array X of the sorted values is made up of X(1) to X(2n).

In addition, the reading unit 111 generates an array V consisting of V(1) to V(2n−1). The reading unit 111 executes the following calculations (up to S207) while repeatedly incrementing a variable "b" from 1 to 2n−1 (in S202). Next, the reading unit 111 initializes V(b) (or sets V(b) to 0) (in S203). After the process of S203, the reading unit 111 executes the following calculations (up to S206) while incrementing a variable "a" from 1 to n (in S204). In the file management table T1 and for the a-th file, assume that the file size of the is Fsize(a), the minimum value of the property for the determination of the division is Fmin(a) and the maximum value of the property for the determination of the division is Fmax(a). Based on the above assumption, when Fmin(a) is less than or equal to X(b) and X(b+1) is less than or equal to Fmax(a), the reading unit 111 calculates a formula of (V(b) =V(b)+Fsize(a)) (in S205), where "=" is an assignment operator.

After repeating S204 to S206 and S202 to S207, the reading unit 111 outputs values V(1) to V(2n−1) (in S208). Subsequently, processing returns to the file storage processing or the file management processing. The amount of data to be read for the property used in the division determination may be calculated by the aforementioned processes.

Figure 19:
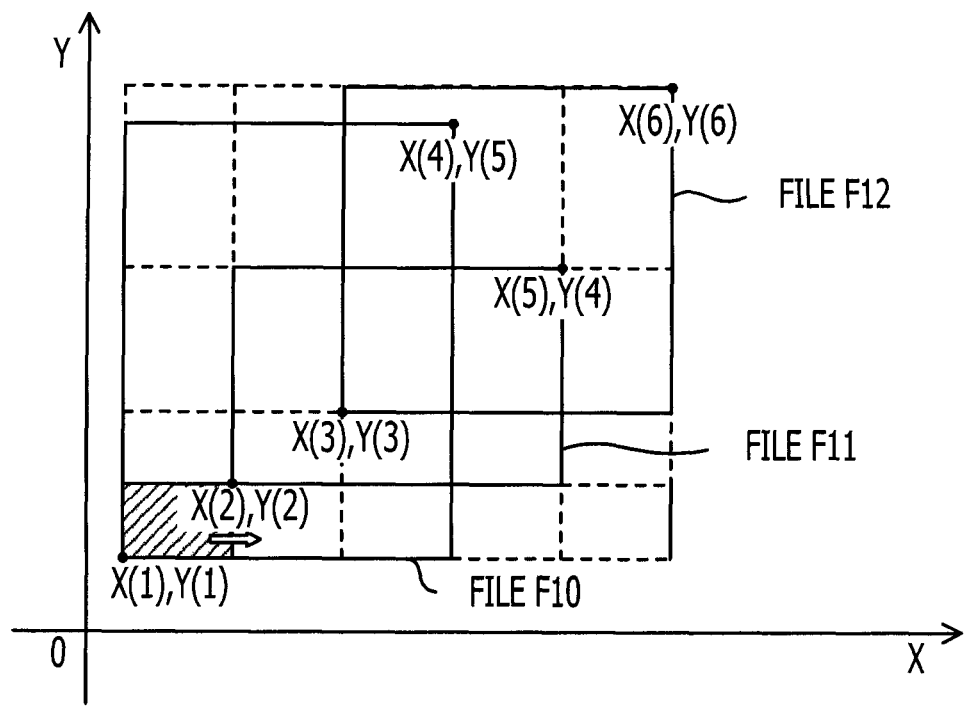
FIG. 19 is a diagram describing a calculation order when there are a plurality of properties for a division determination.

For example, the division determination may be performed based on a plurality of properties. If a plurality of properties are frequently searched for, the performance of the search process for the plurality of properties is maintained by dividing a file based on the plurality of properties. If a plurality of properties are used for the division determination, the processes of S202 to S207 may be repeated for each of the plurality of properties. In this case, the array V is a two-dimensional array, and for arrays of values of which range information has been sorted an array Y is used in addition to the array X. A method for searching a range from which the amount of data to be read is calculated when two properties are used for a determination of division is described with reference to FIG. 19. For example, assume that data included in files F10 to F12 is sorted by minimum and maximum values of a property X of the files F10 to F12 and is also sorted by minimum and maximum values of an property Y of the files F10 to F12, and the sorting results are illustrated in FIG. 19. For example, the minimum value of the property X of the file F10 is X(1), and the minimum value of the property Y of the file F10 is Y(1). The maximum value of the property X of the file F10 is X(4), and the maximum value of the property Y of the file F10 is Y(5). The amounts V of data to be read are changed by separating regions using solid lines. Thus, each value of V for a two-dimensional region may be calculated by calculating the amount V of data for each of unit regions that is separated by solid or dashed lines. For example, after the amount V of data is calculated for the region indicated by hatching, the region targeted for the calculation of S205 is shifted to another region targeted for the calculation of S205 in a direction indicated by an arrow. After the amount V of data is calculated for a region defined by the minimum values X(5) and Y(1) and the maximum values X(6) and Y(2), the region targeted for the calculation of S205 is changed to a region defined by the minimum values X(1) and Y(2) and the maximum values X(2) and Y(3).

In the example of the files F10 to F12 illustrated in FIG. 19, assume that the sizes of the data included in the files F10, F11 and F12 are 1.5 MB, 2 MB and 1 MB, respectively, and the threshold is 4 MB. FIG. 19 illustrates that a region defined by the minimum values X(3) and Y(3) and the maximum values X(4) and Y(4) may be included in each of the files F10 to F12. When a search criterion that is included in the region defined by the minimum values X(3) and Y(3) and the maximum values X(4) and Y(4) is received, each of the files F10 to F12 is read from (searched), and 4.5 MB of data is read. In this case, for example, the reading unit 111 determines that the 4.5 MB exceeds the threshold of 4 MB in the determination of S106 illustrated in FIG. 16 (Yes in S106).

Figure 20:
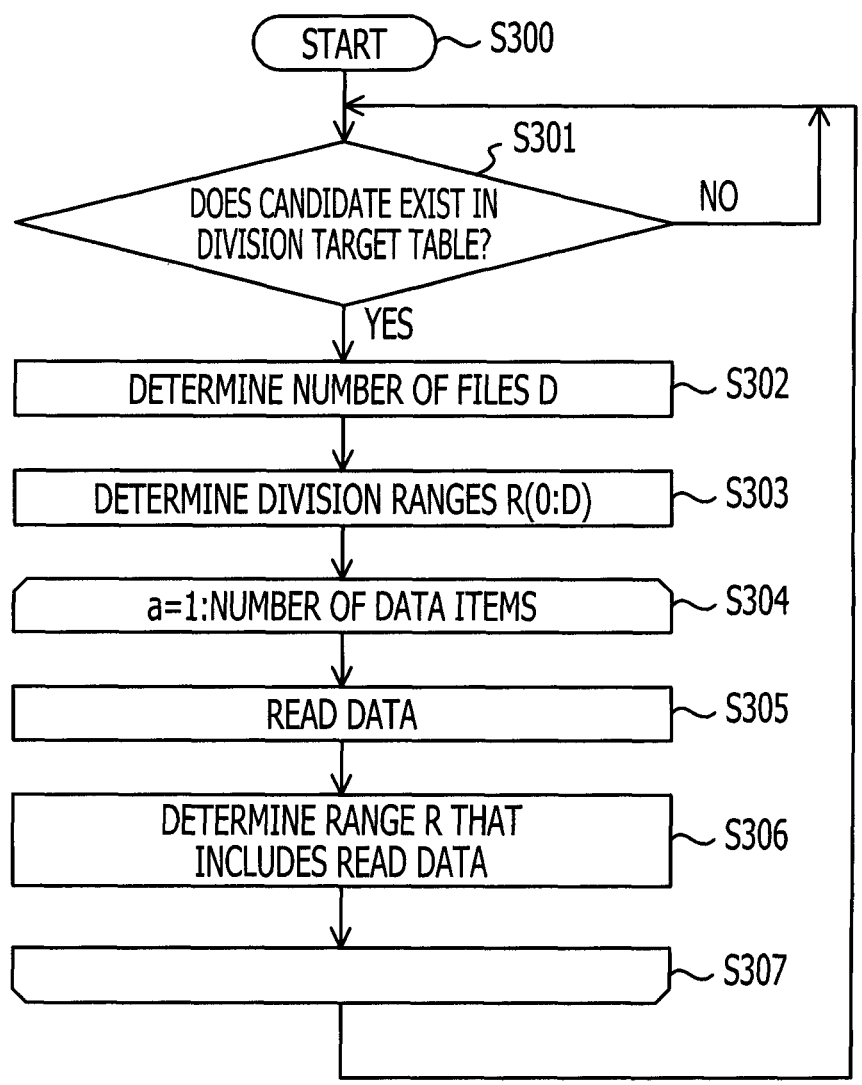
FIG. 20 is an example of a flowchart for a file division process.

FIG. 20 illustrates a flowchart of a process of dividing a file with a name stored in the division target table T3. The dividing unit 112 starts the process (in S300). The dividing unit 112 determines whether the name of a file to be divided is stored in the division target table T3 (in S301). If the name of the file to be divided is not stored (No in S301), the dividing unit 112 executes the process of S301 again (that is, stands by). If the name of the file to be divided is stored (Yes in S301), the dividing unit 112 determines the number D of files into which the file is divided (in S302). For example, the number D may be a predetermined number. For example, when the number D is determined in advance to be "2", the file is divided into two files. The method for determining the number D is described later.

When the number D is determined in S302, the dividing unit 112 determines a range R of values of a property for the division determination for each divided file (in S303). For example, when the number D is "n", the dividing unit 112 generates an array of ranges R(0) to R(n). For example, when the minimum and maximum values of the property for the determination of the division of the file are Fmin and Fmax, R(0)=Fmin and R(n)=Fmax. The dividing unit 112 may determine ranges R(1) to R(n−1) by equally dividing a range of the ranges R(0) to R(n). Specifically, R(a)=R(0)+(R(n)−R(0))*a/n, for example. For example, the dividing unit 112 may set the number n to 2 and set, to R(1), the average of values of a data group that is included in the file to be divided and belongs to the property that is used for the division determination. Another method is described later.

When the ranges R(0:n) are determined in S303, the dividing unit 112 repeatedly executes processes of S305 and S306 on each of data items included in the file to be divided (in S304 and S307). The dividing unit 112 reads data from the file to be divided in the process of S305 and determines a range that includes the read data in the process of S306. In the process of S306, when a value of the read data is in a range of R(a−1) to R(a), the dividing unit 112 determines that the value of the read data is in an a-th range. The data for which the value is in the a-th range is sorted into a divided file a. When the processes of S304 to S307 are completely executed on each of the data items included in the file to be divided, the data items are sorted into the divided files of which the number of divided files is D. In addition, the dividing unit 112 returns to S301 and determines whether another file to be divided exists.

When a plurality of properties are to be used to determine the division, the dividing unit 112 sets, for each property, the number of files D into which the file is divided and division ranges R. When the file is to be divided based on column X and Y, the dividing unit 112 sets the dividing number DX for the direction of the column X and the dividing number DY for the direction of the column Y. In addition, the dividing unit 112 sets division ranges RX (0:DX) in the direction of column X and division ranges RY (0:DY) in the direction of column Y. Furthermore, division ranges for each of the directions may be determined by different methods. For example, a division range RX(a) may be determined by equally dividing a range of RX(0) to RX(DX), and a division range RY(a) may be determined based on the average of the values of the data included in the file to be divided.

Figure 22:
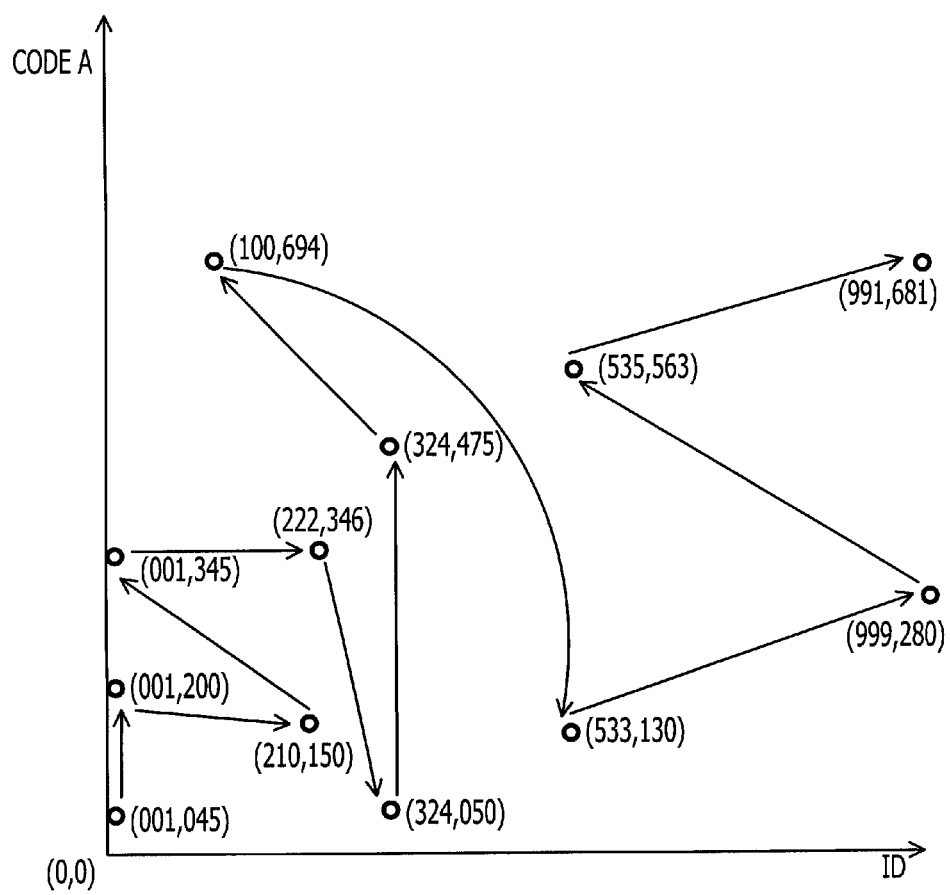
FIG. 22 illustrates a distribution of data included in the file.

Another method for dividing a file when a plurality of properties are used for the division determination is described below. For example, assume that properties to be used for a division determination of a file F20 illustrated in FIG. 21 are "ID" and "code A". FIG. 22 illustrates a distribution of values of "IDs" and values of "codes A", while the values are data included in the file F20. If search requests are received with the same or similar frequency for each of the plurality of properties, it is efficient to create divided files that have data groups of which values are in small ranges in both the "ID" direction and the "code A" direction. For example, assume that with division is performed a small range (that is, groups of 100 values) in one direction (the "ID" direction) and in a large range (that is, groups of 500 values) in the other direction (the "code A" direction). In this case, even though the data size of each block is approximately 1/20 of the overall data size, for a request to search data based on one particular direction (the "code A" direction), data that amounts to approximately half of the overall data is read. A space-filling curve is used in order to set division ranges based on search frequencies for the plurality of properties, while the division ranges are small for each of the directions.

Figure 23A:
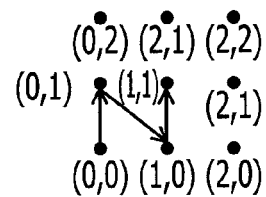
FIG. 23A illustrate examples of a Z-order curve.
Figure 23B:
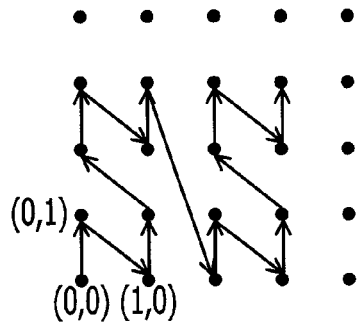
FIG. 23B illustrate examples of a Z-order curve.
Figure 23C:
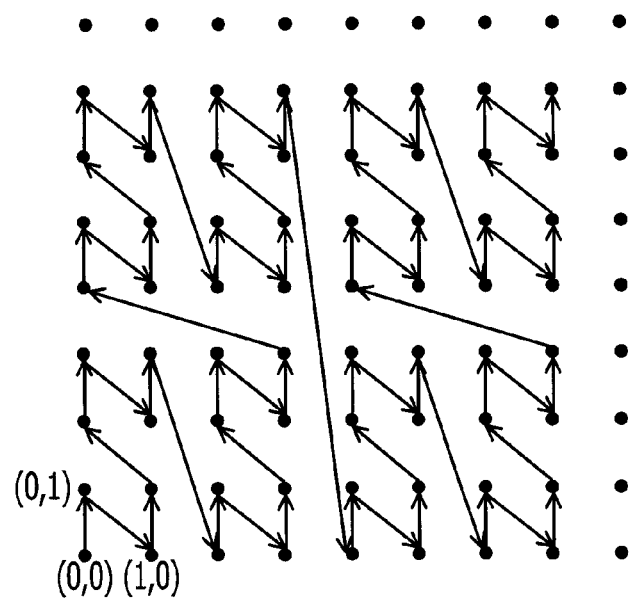
FIG. 23C illustrate examples of a Z-order curve.

For example, a Z-shaped curve is used as the space-filling curve. The Z-shaped curve is a curve illustrated in FIGS. 23A to 23C. The Z-shaped curve extends through grid points that exist in a multidimensional space. Thus, the multidimensional space may be processed in a one-dimension fashion. As illustrated in FIG. 23A, the Z-shaped curve of which the start point is (0, 0) by +1 in the "code A" direction (Y direction) from the point (0, 0) to a point (0, 1). Then, the Z-order curve extends by −1 in Y direction and +1 in the "ID" direction (X direction) from the point (0, 1) to the point (1, 0). Then, the Z-order curve extends by +1 in Y direction from the point (1, 0) to the point (1, 1). The Z-order curve repeats the aforementioned pattern of extending in the Y direction, returning in the Y direction while extending in X direction, and then extending in the Y direction. As illustrated in FIG. 23B, the Z-order curve further extends from the point (1, 1) to a point (0, 2) and repeats the pattern that extends from the point (0, 0) through the points (0, 1) and (1, 0) to the point (1, 1). Then, the Z-order curve repeats the pattern (extending from the point (0, 0) through the points (0, 1) and (1, 0) to the point (1, 1)) from a point (2, 0). Then, the Z-order curve repeats the pattern (extending from the point (0, 0) through the points (0, 1) and (1, 0) to the point (1, 1)) from a point (2, 2). Thus, the pattern that extends from the point (0, 0) through the points (0, 1) and (1, 0) to the point (1, 1) is repeated in the order of the points (0, 0), (0, 2), (2, 0) and (2, 2). In this manner, the repeating pattern of the Z-order curve is a similar shape as the Z-order curve, and is a so-called self-similar pattern. Furthermore, in FIG. 23C, the pattern illustrated in FIG. 23B is repeated from the points (0, 0), (0, 4), (4, 0) and (4, 4) in this order. The Z-order curve illustrated in FIG. 23C also has the self-similar pattern. Points that are close to each other on the Z-order curve illustrated in FIG. 23C exist in a certain range. Thus, when divided files that each include points that are close to each other on the Z-order curve are created, the points included in each of the divided files are close to each other in both X and Y directions.

For example, the path of the Z-order curve can be followed by the following algorithm. First, a coordinate point Z1 of the Z-order curve is expressed by a binary number (for example, Z1=100101101011). Next, the values of the coordinate point Z1 are alternately sorted into an X value and a Y value on a digit basis (for example, Zx1=100111 and Zy1=011001). The sorted values are coordinates in a two-dimensional space (for example, Zx1=39 and Zy1=25).

Figure 24:
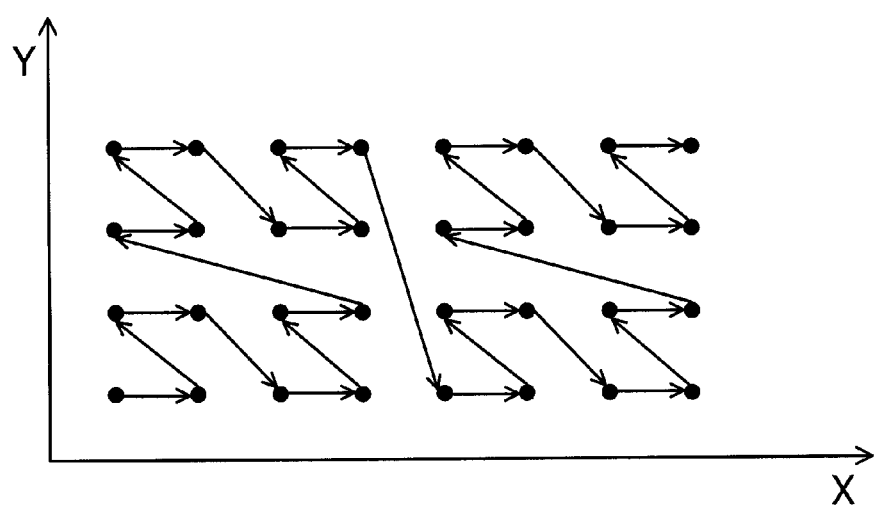
FIG. 24 illustrates an example of a Z-order curve.

The space-filling curve is not limited to the aforementioned Z-order curve. A Z-order curve that has a pattern (illustrated in FIG. 24) starting from the point (0, 0) and extending through the points (1, 0) and (0, 1) to the point (1, 1) may be used instead of the Z-order curve having the pattern starting from the point (0, 0) and extending through the points (0, 1) and (1, 0) to the point (1, 1). For the Z-order curve having the self-similar pattern starting from the point (0, 0) and extending through the points (1, 0) and (0, 1) to the point (1, 1), the order in which values of the coordinate point Z1 of the Z-order curve are alternately sorted is opposite to the aforementioned order.

Figure 25:
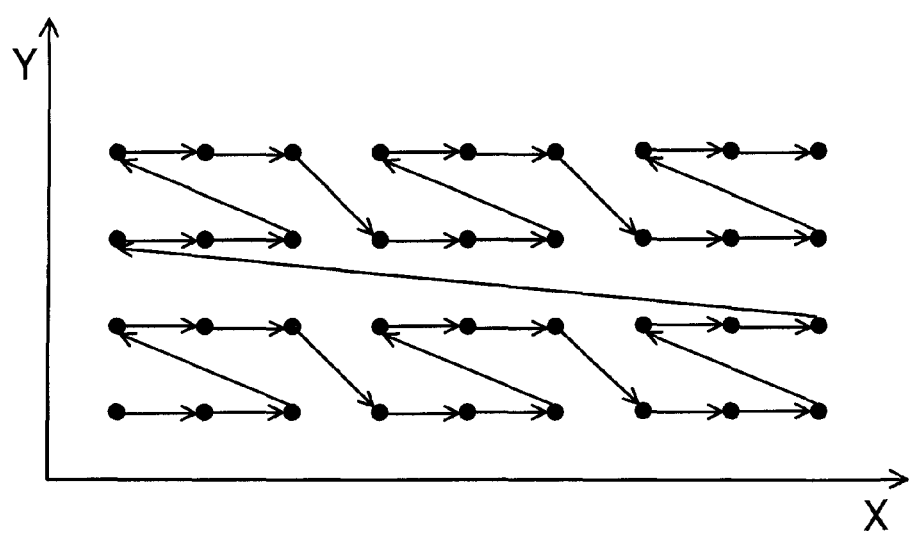
FIG. 25 illustrates an example of a Z-order curve.

In addition, a Z-order curve that has a pattern (illustrated in FIG. 25) starting from the point (0, 0) and extending through the points (1, 0), (2, 0), (0, 1) and (1, 1) to a point (2, 1) may be used. In this case, since the unit extends from 0 through 1 to 2 in the X direction and from 0 to 1 in the Y direction, a ternary number is used for the X direction and a binary number is used for the Y direction. The coordinates in the X-Y space are converted into coordinates of the Z-order curve. The coordinates Zx1 and Zy1 of the point Z1 are 39 and 25, respectively. While the coordinate Zx1 is expressed as a ternary number 1110, the coordinate Zy1 is expressed as a binary number 11001. When the values of the coordinates Zy1 and Zx1 are alternately used, Z1=1011010110. When this value of the point Z1 is used as a ternary number, the grid points in the two-dimensional space are arranged on the Z-order curve in the order illustrated in FIG. 25.

In the aforementioned manner, the self-similar pattern of the Z-order curve is able to be changed. For example, coordinate points that are included in the self-similar pattern illustrated in FIG. 25 and adjacent to each other in the X direction are more likely to be close to each other on the Z-order curve than the pattern illustrated in FIGS. 23A to 23C. Thus, when a file is to be divided based on positions on the Z-order curve having the pattern illustrated in FIG. 25, separation of two points (two data items) located close to each other in X direction into different divided files is suppressed. When a division method described below is used, a self-similar pattern for a Z-order curve may be selected. For example, if the order for data included in a file differs (for example, if a "date" and an "ID" are selected as properties for a division determination, or the like), an X-Y ratio for the self-similar pattern is determined based on the orders. In addition, for example, the X-Y ratio of the self-similar pattern may be determined based on statistical information on the search frequency for each of the properties. For example, every time the searching unit 114 executes the search process, the managing unit controller 113 determines for which property the search process was executed for. Then, the managing unit controller 113 counts, for each property, the number of times that the search process has been executed. When a file is determined to be divided, the managing unit controller 113 uses the ratio (or a ratio close to the ratio) of a value counted for the property X to a value counted for the property Y as the X-Y ratio of the self-similar pattern. In this case, the self-similar pattern is set by using a base n for the property X or Y for which the frequency of the search process is higher than the other property. As a result, because dividing the file based on a property with a high search frequency produces a large number of divided files, the search performance is unlikely to be reduced. In addition, if the X-Y coordinates are converted into coordinates on a Z-order curve with a pattern such as the self-similar pattern illustrated in FIG. 25 using different standard numbers for X and Y directions, there is a range in which data does not exist on the Z-order curve. In the example illustrated in FIGS. 23A to 23C, a value on the Z-order curve is changed from 0 through 1, 2, 10, 11, 12, 100, . . . . If the values on the Z-order curve are expressed by ternary numbers, values 21 and 22 exist between 12 and 100. This is due to the fact that since parts of the Z-order curve extend in Y direction using binary numbers, "2" is not used for second digits of the coordinates on the Z-order curve. Thus, when the base number n to be used for conversion different for X and Y directions, there is a range in which data does not exist between units on the Z-order curve. Thus, a distance between the units is large, and a file that corresponds to the units is easily divided.

Alternatively, for example, a Hilbert curve may be used as the space-filling curve instead of the Z-order curve.

Figure 26:
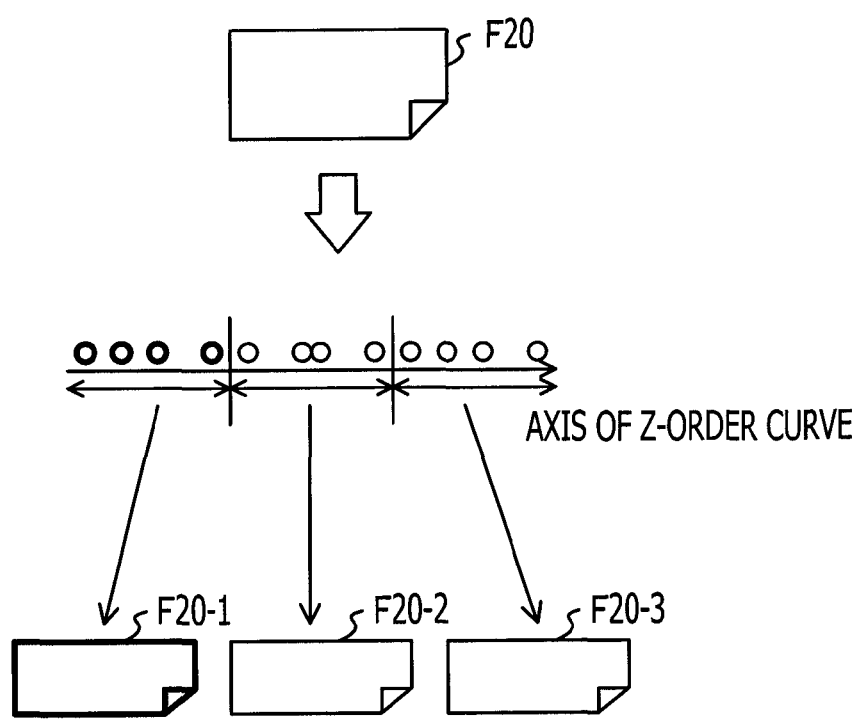
FIG. 26 illustrates a depiction of division using a Z-order curve.

Data items of the file F20 illustrated in FIG. 21 are arranged in an order indicated by arrows illustrated in FIG. 22 on a Z-order curve that extends through two-dimensionally arranged grid points in the aforementioned order. The data items that are included in the file F20 and are two-dimensionally represented using "ID" and "code A" may be one-dimensionally represented by representing the data items in the order indicated by the arrows, as illustrated in FIG. 26. In this case, for example, division ranges are determined by equally dividing the Z-order curve, or dividing the Z-order curve at a point corresponding to the average of sequence numbers of the order in which the data items are arranged on the Z-order curve in a similar manner to the situation where one property is used for the determination of the division.

X values ("ID" values), Y values ("code A" values) and Z values are illustrated in FIG. 27, where the X and Y values are included in the file F20 that is illustrated in FIG. 21 and are represented in FIG. 27 by decimal numbers. Each item in the "length (Z)" column indicates a distance on the Z-order curve between the previous record and the data record. Each item in the "rank" column, which is located next to the "length (Z)" column, indicate a sequence number for the descending order of distances on the Z-order curve. In addition, each item in the "length (X-Y)" column indicates a distance in the X-Y space between data in the previous record and the current record. Each item in the "rank" column that is located to the right of the "length (X-Y)" column indicates a rank for the descending order of the distances in the X-Y space.

For example, division ranges of the file F20 may be determined by separating data items between which a distance (either the value of "length (Z)" or the value of "length (X-Y)") is large. For example, when the number of files into which the file F20 is divided is 2, division ranges of the file F20 are determined by separating data items (100, 694) and (533, 130). Specifically, the file F20 is divided into a file having data items connected by a Z-order curve extending from a data item (001, 045) to the data item (100, 694), and a file having data items connected by a Z-order curve extending from the data item (533, 130) to a data item (991, 681). If the number of files into which the file F20 is divided is larger than 2, for example, division ranges of the file F20 are determined by separating data items corresponding to "ranks" that are 2 or larger. In this case, as the ranks, either the "rank" for "lengths (Z)" or the "rank" for "length (X-Y)" may be used.

Figure 28:
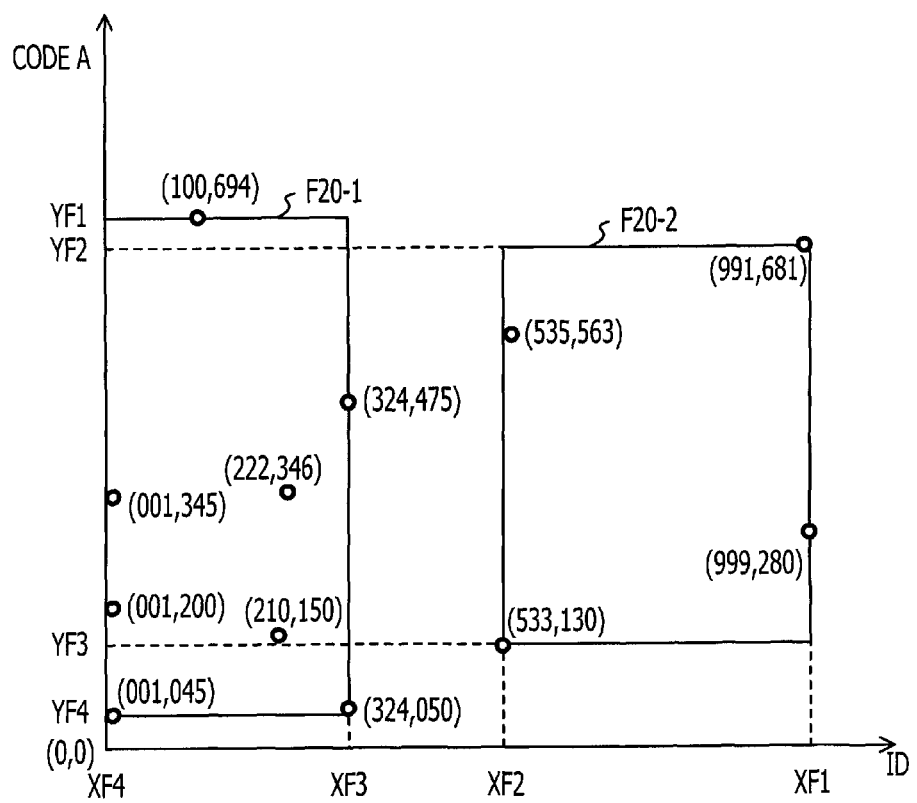
FIG. 28 illustrates an example of division of the file.

FIG. 28 illustrates an example in which when the number of files that the file F20 is divided into is 2, the file F20 is divided into files F20-1 and F20-2 by separating both data items that have the largest "length (Z)" between each other as well as data items that have the second largest "length (Z)" between each other. Ranges of the divided files F20-1 and F20-2 in X direction become significantly small (ranges of values of "IDs" shrink). X values of the file F20 are in a range of 001 to 999. X values of the divided file F20-1 are in a range of 001 to 324, and X values of the divided file F20-2 are in a range of 533 to 999.

Figure 29:
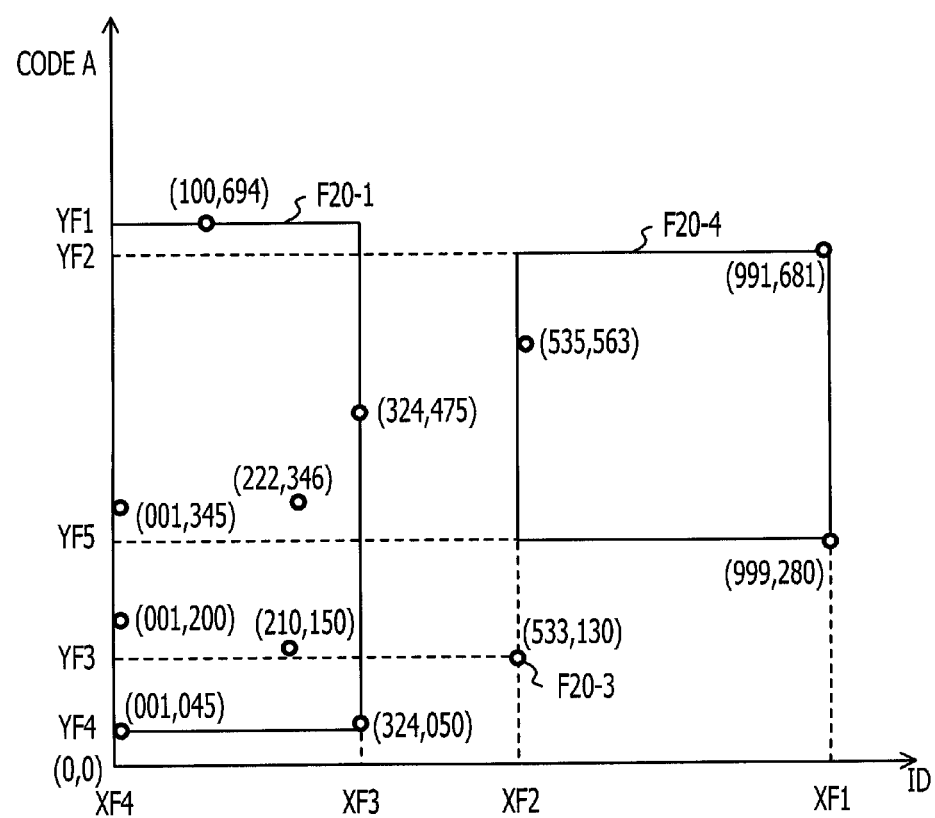
FIG. 29 illustrates an example of division of the file.

FIG. 29 illustrates an example in which when the number of files that the file F20 is divided into is 3, the file F20 is divided by separating data items that have the largest "length (Z)" between each other, data items that have the second largest "length (Z)" between each other, as well as data items that have the third largest "length (Z)" between each other. The divided file F20-2 illustrated in FIG. 26 is further divided into files F20-3 and F20-4. Y values of the divided file F20-2 are in a range of 130 to 681 in the Y direction. The Y value of the file F20-3 is 130, and Y values of the file F20-4 are in a range of 280 to 681 in the Y direction.

As another method for determining division ranges, there is a method for evaluating cases where a file is divided by separating data items on a Z-order curve from each other. For example, a determination of whether the file F20 is divided by separating data items (324, 475) and (100, 694) from each other or separating data items (100, 694) and (533, 130) from each other is described as an example. Data to be compared may be all of the data in the file F20 or a part of all the data in the file F20.

For example, a product of the maximum and minimum values on a Z-order curve of data included in each file into which the file F20 is divided is used for the evaluation. It can be considered that the smaller the product, the shorter the distance between data items located on the Z-order curve that is included in a divided file. According to FIG. 27, the Z value of the data item (1, 45) is 1107, the Z value of a data item (324, 475) is 225637, the Z value of the data item (100, 694) is 290100, the Z value of the data item (533, 130) is 541222, and the Z value of the data item (991, 681) is 976619. An evaluation value, obtained when the file F20 is divided by separating the data items (324, 475) and (100, 694) from each other, is approximately $1.5 \times 10^{11}$. An evaluation value, obtained when the file F20 is divided by separating the data items (100, 694) and (533, 130) from each other, is approximately $1.3 \times 10^{11}$. In this case, the file F20 is divided by separating, from each other, the data items (100, 694) and (533, 130) that have a smaller evaluation value.

As described above, the amount of data to be read for search process may be reduced by dividing a file. However, if the number of files is excessively increased, overhead, such as overhead caused by opening and closing files, increases. For example, when the amount of time to extract a file is indicated by Ce, the amount of time Ce is mainly divided into (1) an amount of time to read the file, (2) an amount of time to specify the file to be read, and (3) an amount of time to open and close the file.

The amounts of time (1) to (3) are estimated using parameters described below, for example. The amount of time (1) is estimated as ((the size of the file to be divided)/(the number of files into which the file is divided)×(the number of files to be opened)×(a proportionality coefficient that depends on I/O performance), for example. The amount of time (2) is estimated as (the number of the files into which the file is divided)×(the size of search assistance information)×(a coefficient that depends on the performance of access to management information), for example. The amount of time (3) is estimated as (the number of the files to be opened)×(an amount of time to open and close a single file), for example.

If the number of files into which the file is divided is increased, the amount of data to be read is reduced. Thus, it may be considered that the amount of time (1) to read files is reduced. However, when the number of files into which the file is divided is increased, the amount of overhead for one file, such as the time to specify a file to be read, increases, because the volume of reference processing for the search assistance information increases. Thus, for example, in S302 illustrated in FIG. 20, the number of files into which the file is divided is determined based on the aforementioned formulas. As described above, the number of files into which the file is divided may be determined in advance. For example, the number of files into which the file is divided may be determined to be 2 or 3.

In addition, for example, the amount of time (3) is estimated based on the number of the files, the threshold for the amount of data to be read is set based on the number of the files. For example, every time the number of files is increased by 1, the threshold illustrated in FIGS. 1 to 6 is reduced by a value corresponding to the amount of data capable of being read for an amount of time that is equal to an amount of time to open or close a single file and then set. Thus, when the number of the files is large, the search performance is hardly reduced due to overhead, such as overhead caused by a process of opening or closing a file.

Figure 30:
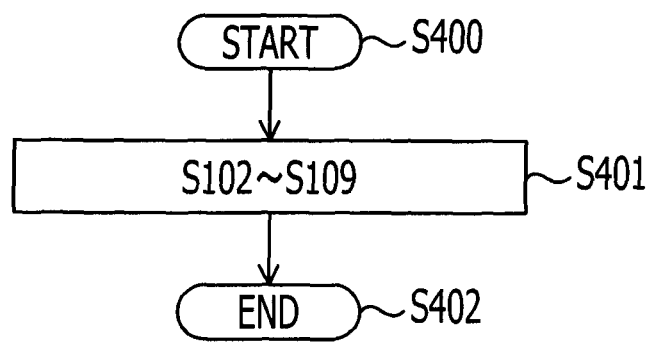
FIG. 30 is an example of a flowchart for a file management process.

Next, the situation where a file is divided based on monitoring of stored files is described. FIG. 30 is an example of a flowchart of the file management process that is executed by the managing unit controller 113. The trigger for the file management process is different from the trigger for the file division determination process that is executed by the reading unit 111. Firstly, when the managing unit controller 113 starts to monitor the files (in S400), the managing unit controller 113 executes the processes of S102 to S109 illustrated in FIG. 16 (in S401). Afterwards, the managing unit controller 113 terminates the file management process (in S402).

Figure 31:
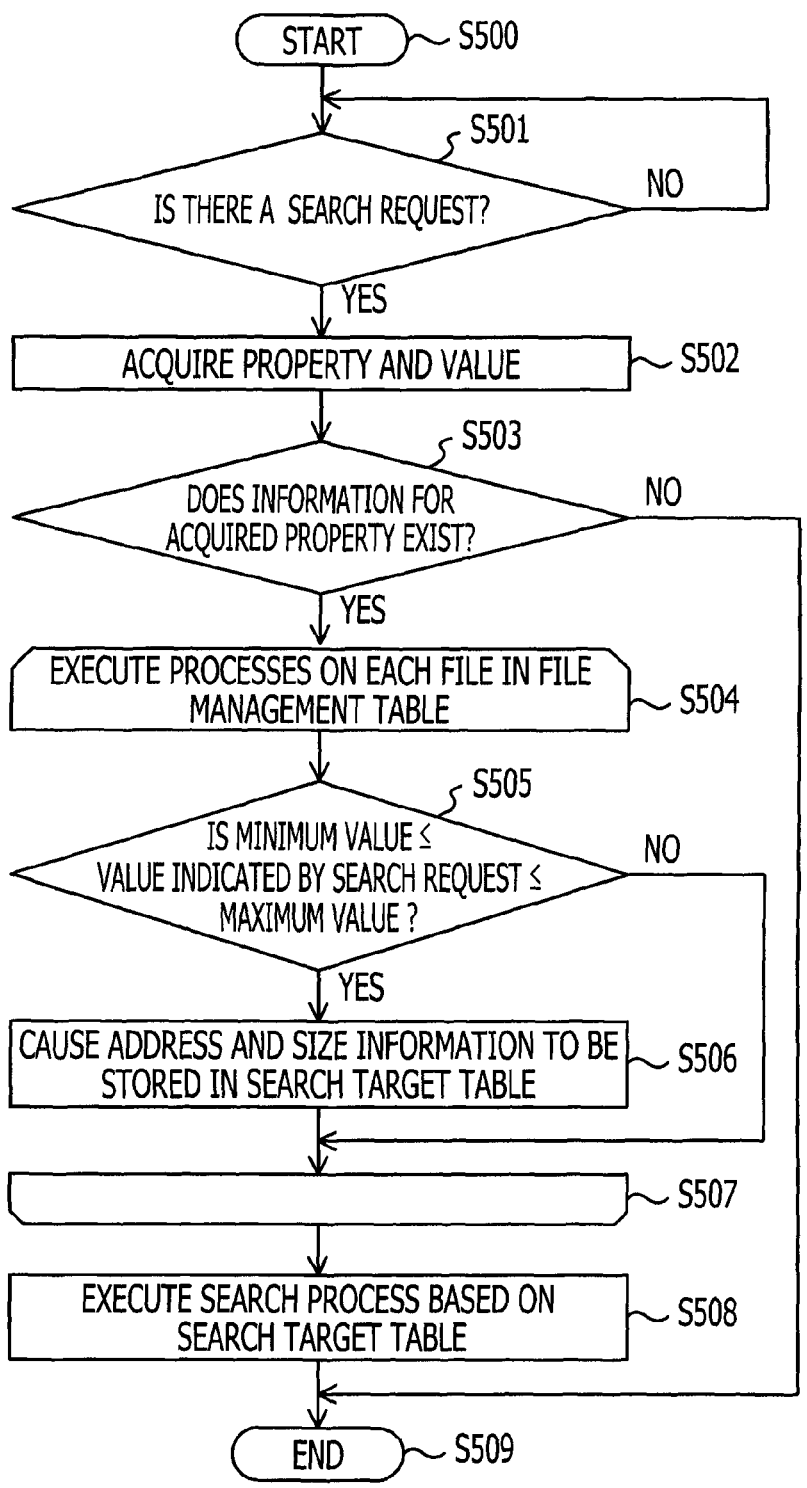
FIG. 31 is an example of a flowchart for a file search process.

Next, procedures for the search process to be executed when a search request is received are described. FIG. 31 is an example of a flowchart of the search process that is executed by the searching unit 114. Firstly, the searching unit 114 starts the search process (in S500). The searching unit 114 determines whether the searching unit 114 has received a search request (in S501). Then, the searching unit 114 acquires a property and a data value from the received search request (in S502). The searching unit 114 determines whether information of the property acquired in S502 is included in the file management table T1 (in S503). If the property acquired from the search request does not exist (No in S503), the search process proceeds to S509. The searching unit 114 executes the following processes on files for which management information is stored in the file management table T1 (in S504 to S507). The searching unit 114 determines whether the value indicated by the search request is both greater than or equal to the minimum value of the property determined in S503 and less than or equal to the maximum value of the property determined in S503 (in S505). For a file that meets the relationship that the value indicated by the search request is both greater than or equal to the minimum value of the property determined in S503 and less than or equal to the maximum value of the property determined in S503 (Yes in S505), the searching unit 114 causes the address and size information of the file to be stored in the search target table T2 illustrated in FIG. 15 (in S506). If the determination in S505 is negative (No in S505), the search process proceeds to S507. searching unit After the processes of S504 to S507 finish, the searching unit 114 reads a file based on the information of the search target table T2, executes the search process that satisfies the search criteria (property and value) acquired in S502, and outputs the search results (in S508). After the aforementioned procedures, the search process ends (in S509).

All examples and conditional language recited herein are intended for pedagogical purposes to aid the reading unit in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiment of the present disclosure has been described in detail, it should be understood that the various changes, substitutions, and alterations could be made hereto without departing from the spirit and scope of the disclosure.

What is claimed is:

1. An information processing apparatus comprising:
a processor configured to:
divide a first file of a first plurality of files stored in a storage device into a second plurality of files, each of the second plurality of files including a different range of values, when each range of values corresponding to each of the first plurality of files includes a specific range and a total size of the first plurality of files exceeds a threshold, wherein
the threshold is reduced as a number of the first plurality of files is increased, and
the processor is configured to divide at least one of the first plurality of files other than the first file and any of the second plurality of files, when a sum of data sizes of the first plurality of files other than the first file and a data size of any of the second plurality of files that corresponds to a range of values partially overlaps a range of values commonly corresponding to the first plurality of files other than the first file, exceeds the threshold.

2. The information processing apparatus according to claim 1, wherein
the processor is configured to control execution a search process on at least one file of the first and second plurality of files which corresponds to a range of values including a value specified by a received search criterion.

3. The information processing apparatus according to claim 1, wherein
data sizes of each of the first plurality of files is less than or equal to a given size, and
the first file is divided when a given number of files included in the first plurality of files correspond to ranges of values each of which include a common range.

4. The information processing apparatus according to claim 3, wherein
the second plurality of files includes a file corresponding to a range of values which do not includes a part of the common range, and a file corresponding to a range of values includes the part of the common range.

5. The information processing apparatus according to claim 4, wherein
the values included in the first plurality of files correspond to a predetermined property.

6. The information processing apparatus according to claim 5, wherein
the first file includes values corresponding to the predetermined property and other values corresponding to another property, and
both of a range of the predetermined property and a range of the another property are not same among the second plurality of files.

7. The information processing apparatus according to claim 6, wherein
the processor is configured to:
generate a space-filling curve including values corresponding to the predetermined property, values corresponding to the other property, and grid points in a two-dimensional space; and
divide the space-filling curve, wherein
the first file is divided into files each of which includes values on the divided space-filling curve.

8. The information processing apparatus according to claim 7, wherein
a ratio of a vertical length to horizontal length of each unit of a self-similar pattern of the space-filling curve is determined based on a ratio of a range of values, which corresponds to the predetermined property and is included in the first plurality of files, to a range of values, which correspond to the another property and is included in the first plurality of files.

9. The information processing apparatus according to claim 7, wherein
the space-filling curve is at least one of a Z-order curve and a Hilbert curve.

10. The information processing apparatus according to claim 1, wherein
the first file is divided into the second plurality of files corresponding to ranges of values which do not overlap each other.

11. The information processing apparatus according to claim 1, further comprising:
a memory configured to store ranges of values of the first plurality of files stored in the storage device.

12. A system comprising:
a storage device that stores a first plurality of files; and
an information processing device including:
a processor configured to
divide a first file of a first plurality of files stored in a storage device into a second plurality of files, each of the second plurality of files including a different range of values, when each range of values corresponding to each of the first plurality of files includes a specific range and a total size of the first plurality of files exceeds a threshold, wherein the threshold is reduced as a number of the first plurality of files is increased, and
the processor is configured to divide at least one of the first plurality of files other than the first file and any of the second plurality of files, when a sum of data sizes of the first plurality of files other than the first file and a data size of any of the second plurality of files that corresponds to a range of values partially overlaps a range of values commonly corresponding to the first plurality of files other than the first file, exceeds the threshold.

13. A method comprising:
dividing, by a processor, a first file of a first plurality of files stored in a storage device into a second plurality of files, each of the second plurality of files including a different range of values, when each range of values corresponding to each of the first plurality of files includes a specific range and a total size of the first plurality of files exceeds a threshold, wherein
the threshold is reduced as a number of the first plurality of files is increased, and
dividing at least one of the first plurality of files other than the first file and any of the second plurality of files, when a sum of data sizes of the first plurality of files other than the first file and a data size of any of the second plurality of files that corresponds to a range of values partially overlaps a range of values commonly corresponding to the first plurality of files other than the first file, exceeds the threshold.

14. A non-transitory computer-readable recording medium storing a file management program that causes a computer to execute a procedure, the procedure comprising:
dividing a first file of a first plurality of files stored in a storage device into a second plurality of files, each of the second plurality of files including a different range of values, when each range of values corresponding to each of the first plurality of files includes a specific range and a total size of the first plurality of files exceeds a threshold, wherein
the threshold is reduced as a number of the first plurality of files is increased, and
dividing at least one of the first plurality of files other than the first file and any of the second plurality of files, when a sum of data sizes of the first plurality of files other than the first file and a data size of any of the second plurality of files that corresponds to a range of values partially overlaps a range of values commonly corresponding to the first plurality of files other than the first file, exceeds the threshold.

* * * * *